US012549197B2

(12) United States Patent
Yamasaki et al.

(10) Patent No.: US 12,549,197 B2
(45) Date of Patent: Feb. 10, 2026

(54) CONVERSION DEVICE, CONVERSION METHOD, REVERSE CONVERSION DEVICE, REVERSE CONVERSION METHOD, AND PROGRAM

(71) Applicant: KEIO UNIVERSITY, Tokyo (JP)

(72) Inventors: Nobuyuki Yamasaki, Kanagawa (JP); Masayuki Takeda, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 181 days.

(21) Appl. No.: 18/699,990

(22) PCT Filed: Oct. 6, 2022

(86) PCT No.: PCT/JP2022/037497
§ 371 (c)(1),
(2) Date: Apr. 10, 2024

(87) PCT Pub. No.: WO2023/063226
PCT Pub. Date: Apr. 20, 2023

(65) Prior Publication Data

US 2024/0413838 A1 Dec. 12, 2024

(30) Foreign Application Priority Data

Oct. 11, 2021 (JP) ................................ 2021-166735

(51) Int. Cl.
*H03M 7/40* (2006.01)
*H03M 7/20* (2006.01)
(Continued)

(52) U.S. Cl.
CPC ........... *H03M 7/4012* (2013.01); *H03M 7/20* (2013.01); *H03M 7/46* (2013.01); *H03M 13/63* (2013.01); *H04L 1/0041* (2013.01)

(58) Field of Classification Search
CPC ........ H03M 7/4012; H03M 7/46; H03M 7/20; H03M 13/63; H04L 1/0041
(Continued)

(56) References Cited

U.S. PATENT DOCUMENTS 6,690,309 B1 * 2/2004 James ..................... H04L 25/14 341/50
10,498,360 B2 * 12/2019 Arai ...................... H03M 13/09

FOREIGN PATENT DOCUMENTS

JP 2013-153394 8/2013

OTHER PUBLICATIONS

International Search Report for PCT/JP2022/037497 mailed on Nov. 22, 2022.

(Continued)

*Primary Examiner* — Khai M Nguyen
(74) *Attorney, Agent, or Firm* — IPUSA, PLLC

(57) ABSTRACT

One aspect of the present disclosure relates to a conversion device including an acquisition unit configured to acquire a first bit string having a first bit length L1; a conversion unit configured to convert, in accordance with conversion information that associates respective bit strings each having the first bit length L1 with bit strings each having a second bit length L2 uniquely assigned to the respective bit strings, the first bit string into a second bit string having the second bit length L2. The conversion information is created by searching for a clique that includes $2^{L1}$ or more nodes, from a graph including nodes and an edge representing the bit strings each having the second bit length L2 that satisfy a predetermined constraint condition.

22 Claims, 17 Drawing Sheets

(51) Int. Cl.
*H03M 7/46* (2006.01)
*H03M 13/00* (2006.01)
*H04L 1/00* (2006.01)

(58) Field of Classification Search
USPC ........................................ 341/50, 51, 58, 59
See application file for complete search history.

(56) References Cited

OTHER PUBLICATIONS

Kanahara, Kazuho et al. Performance of Iterated k-opt Local Search based on Search Frequency Information for the Maximum Clique Problem. Materials of the 109th Workshop on Fundamental Problems of Artificial Intelligence. (SIG-FPAI-B803) Mar. 5, 2019 (With English abstract).

Suito, Kazutoshi et al. Design and Implementation of Dependable Communication Mechanism on Responsive Link for Distributed Real-time Systems. IPSJ Journal. Dec. 15, 2012, vol. 53, No. 12, pp. 2728-2739 (With English abstract).

Extended European Search Report mailed on Jan. 15, 2025 issued with respect to the corresponding European Patent Application No. 22880921.6.

Takeda Masayuki et al: "Finding the Maximum Number of Symbols for the 4b/10b Line Code with Error Correction", 2019 Seventh International Symposium on Computing and Networking Workshops (CANDARW), IEEE, Nov. 26, 2019 (Nov. 26, 2019), pp. 460-464, XP033688091, DOI: 10.1109/CANDARW.2019.00087 [retrieved on Jan. 7, 2020].

Takeda Masayuki et al: "Codeword Set Selection for the Error-Correcting 4b/10b Line Code with Maximum Clique Enumeration", IEICE Transactions on Fundamentals of Electronics, Communications and Computer Sciences., vol. E103.A, No. 10, Oct. 1, 2020 (Oct. 1, 2020), pp. 1227-1233, XP093236205, JP ISSN: 0916-8508, DOI: 10.1587/transfun.2019DMP0019.

Immink Kees A Schouhamer: "A New DC-Free Runlength Limited Coding Method for Data Transmission and Recording", IEEE Transactions on Consumer Electronics, IEEE Service Center, New York, NY, US, vol. 65, No. 4, Nov. 1, 2019 (Nov. 1, 2019), pp. 502-505, XP011751589, ISSN: 0098-3063, DOI: 10.1109/TCE.2019.2932795 [retrieved on Oct. 23, 2019].

* cited by examiner

11101100110000

00010011011101

HAMMING DISTANCE = 12

START

S101
ACQUIRE BIT STRING HAVING BIT LENGTH L1

S102
CONVERT ACQUIRED BIT STRING INTO BIT STRING HAVING BIT LENGTH L2 IN ACCORDANCE WITH CONVERSION INFORMATION

END

FIG.12

| | | | |
|---|---|---|---|
| 00010011011101 | 00100111010011 | 01000011111001 | 01011010110010 |
| 00010011101110 | 00100111101100 | 01000101101011 | 01011101001010 |
| 00010011110011 | 00101001101110 | 01000110011101 | 01011101010100 |
| 00010101011110 | 00101001111001 | 01000110101110 | 01011101100001 |
| 00010101111001 | 00101011001101 | 01000110110011 | 01011110000011 |
| 00010110101101 | 00101011110010 | 01000111011010 | 01011110100100 |
| 00010110111010 | 00101100011110 | 01000111100101 | 01100001111100 |
| 00010111001011 | 00101100101101 | 01001001011110 | 01100010101101 |
| 00010111110100 | 00101100110011 | 01001001101101 | 01100010111010 |
| 00011001110101 | 00101101001011 | 01001001110011 | 01100100011011 |
| 00011001111010 | 00101101110100 | 01001011010101 | 01100101001110 |
| 00011010011011 | 00101110010101 | 01001011101010 | 01100101110001 |
| 00011010111100 | 00101110101010 | 01001100110101 | 01100111001001 |
| 00011011010110 | 00101111000110 | 01001100111010 | 01100111010100 |
| 00011011101001 | 00101111100001 | 01001101011001 | 01100111100010 |
| 00011100011101 | 00110001011011 | 01001101100110 | 01101000011101 |
| 00011100101011 | 00110001101101 | 01001110010110 | 01101000101011 |
| 00011100110110 | 00110001110110 | 01001110101001 | 01101000110110 |
| 00011101010011 | 00110100101110 | 01001111001100 | 01101010001110 |
| 00011101101100 | 00110100110101 | 01010010011110 | 01101010110001 |
| 00011110001110 | 00110110011100 | 01010010101011 | 01101011000011 |
| 00011110110001 | 00110110100011 | 01010010110101 | 01101101000101 |
| 00011111000101 | 00111001011100 | 01010100111100 | 01101101010010 |
| 00100011011110 | 00111001100011 | 01010101001101 | 01110000110011 |
| 00100011101011 | 00111011001010 | 01010101110010 | 01110001010101 |
| 00100011110101 | 00111011010001 | 01010111000110 | 01110001101010 |
| 00100101011101 | 00111011100100 | 01010111010001 | 01110010011001 |
| 00100101111010 | 00111110001001 | 01011000101110 | 01110010100110 |
| 00100110110110 | 00111110010010 | 01011000111001 | 01110011001100 |
| 00100110111001 | 01000011110110 | 01011010001101 | 01110011010010 |

FIG.13

| | | | |
|---|---|---|---|
| 01110011100001 | 10001110001101 | 10101010010110 | 11000001110101 |
| 01110100010110 | 10001110110010 | 10101010101001 | 11000011100011 |
| 01110100101001 | 10001111010100 | 10101101001100 | 11000100101101 |
| 01110110000101 | 10010001111100 | 10101101010001 | 11000100110110 |
| 01110110001010 | 10010010110110 | 10101101100010 | 11000101011100 |
| 01111000011010 | 10010010111001 | 10101110000011 | 11001010011100 |
| 01111000100101 | 10010100011011 | 10101110100100 | 11001011001001 |
| 01111001000110 | 10010101010101 | 10110000101011 | 11001011010010 |
| 01111001001001 | 10010101101010 | 10110001001110 | 11001011100100 |
| 01111010010100 | 10010111001100 | 10110001110001 | 11001100100011 |
| 01111100001100 | 10010111010010 | 10110010011010 | 11001110001010 |
| 01111100010001 | 10010111100001 | 10110010100101 | 11001110010001 |
| 01111100100010 | 10011000011110 | 10110011001001 | 11010000011101 |
| 10000011101101 | 10011000101101 | 10110011010100 | 11010000111010 |
| 10000011111010 | 10011000110011 | 10110011100010 | 11010001010110 |
| 10000101110011 | 10011010010101 | 10110100001101 | 11010001101001 |
| 10000110011110 | 10011010101010 | 10110100110010 | 11010010010011 |
| 10000110101011 | 10011011000011 | 10110101100100 | 11010010101100 |
| 10000110110101 | 10011101000110 | 10110110000110 | 11010011000101 |
| 10000111011001 | 10011101001001 | 10110110010001 | 11010011001010 |
| 10000111100110 | 10100010011101 | 10111000011001 | 11010100001110 |
| 10001001011101 | 10100010101110 | 10111000100110 | 11010100110001 |
| 10001001101011 | 10100010110011 | 10111001000101 | 11010101000011 |
| 10001001110110 | 10100100111100 | 10111001010010 | 11010110001001 |
| 10001011001110 | 10100101010110 | 10111010001100 | 11010110010100 |
| 10001011110001 | 10100101101001 | 10111100001010 | 11010110100010 |
| 10001100101110 | 10100111000101 | 10111100010100 | 11011000001011 |
| 10001100111001 | 10100111001010 | 10111100100001 | 11011000110100 |
| 10001101011010 | 10101000110101 | 11000001011011 | 11011001001100 |
| 10001101100101 | 10101000111010 | 11000001101110 | 11011001010001 |

FIG.14

| |
|---|
| 11011001100010 |
| 11011010000110 |
| 11011010100001 |
| 11011100000101 |
| 11011100010010 |
| 11100000111001 |
| 11100001001101 |
| 11100001110010 |
| 11100010001011 |
| 11100010110100 |
| 11100011000110 |
| 11100011010001 |
| 11100100010101 |
| 11100100101010 |
| 11100110001100 |
| 11100110010010 |
| 11100110100001 |
| 11101000010011 |
| 11101000101100 |
| 11101001001010 |
| 11101001010100 |
| 11101001100001 |
| 11101010000101 |
| 11101010100010 |
| 11101100000110 |
| 11101100001001 |

FIG.15

| | |
|---|---|
| 00000000 | 00010011011101 |
| 00000001 | 00010011101110 |
| ⋮ | ⋮ |
| 11111110 | 11000011100011 |
| 11111111 | 11000100101101 |
| Special character#1 | 11000100110110 |
| ⋮ | ⋮ |

FIG.16

| | | | | | | | |
|---|---|---|---|---|---|---|---|
| D.0 | 00010011011101 | D.30 | 00100111010011 | D.60 | 01000011111001 | D.90 | 01011010110010 |
| D.1 | 00010011101110 | D.31 | 00100111101100 | D.61 | 01000101101011 | D.91 | 01011101001010 |
| D.2 | 00010011110011 | D.32 | 00101001101110 | D.62 | 01000110011101 | D.92 | 01011101010100 |
| D.3 | 00010101011110 | D.33 | 00101001111001 | D.63 | 01000110101110 | D.93 | 01011101100001 |
| D.4 | 00010101111001 | D.34 | 00101011001101 | D.64 | 01000110110011 | D.94 | 01011110000011 |
| D.5 | 00010110101101 | D.35 | 00101011110010 | D.65 | 01000111011010 | D.95 | 01011110100100 |
| D.6 | 00010110111010 | D.36 | 00101100011110 | D.66 | 01000111100101 | D.96 | 01100001111100 |
| D.7 | 00010111001011 | D.37 | 00101100101101 | D.67 | 01001001011110 | D.97 | 01100010101101 |
| D.8 | 00010111110100 | D.38 | 00101100110011 | D.68 | 01001001101101 | D.98 | 01100010111010 |
| D.9 | 00011001110101 | D.39 | 00101101001011 | D.69 | 01001001110011 | D.99 | 01100100011011 |
| D.10 | 00011001111010 | D.40 | 00101101110100 | D.70 | 01001011010101 | D.100 | 01100101001110 |
| D.11 | 00011010011011 | D.41 | 00101110010101 | D.71 | 01001011101010 | D.101 | 01100101110001 |
| D.12 | 00011010111100 | D.42 | 00101110101010 | D.72 | 01001100110101 | D.102 | 01100111001001 |
| D.13 | 00011011010110 | D.43 | 00101111000110 | D.73 | 01001100111010 | D.103 | 01100111010100 |
| D.14 | 00011011101001 | D.44 | 00101111100001 | D.74 | 01001101011001 | D.104 | 01100111100010 |
| D.15 | 00011100011101 | D.45 | 00110001011011 | D.75 | 01001101100110 | D.105 | 01101000011101 |
| D.16 | 00011100101011 | D.46 | 00110001101101 | D.76 | 01001110010110 | D.106 | 01101000101011 |
| D.17 | 00011100110110 | D.47 | 00110001110110 | D.77 | 01001110101001 | D.107 | 01101000110110 |
| D.18 | 00011101010011 | D.48 | 00110100101110 | D.78 | 01001111001100 | D.108 | 01101010001110 |
| D.19 | 00011101101100 | D.49 | 00110100110101 | D.79 | 01010010011110 | D.109 | 01101010110001 |
| D.20 | 00011110001110 | D.50 | 00110110011100 | D.80 | 01010010101011 | D.110 | 01101011000011 |
| D.21 | 00011110110001 | D.51 | 00110110100011 | D.81 | 01010010110101 | D.111 | 01101101000101 |
| D.22 | 00011111000101 | D.52 | 00111001011100 | D.82 | 01010100111100 | D.112 | 01101101010010 |
| D.23 | 00100011011110 | D.53 | 00111001100011 | D.83 | 01010101001101 | D.113 | 01110000110011 |
| D.24 | 00100011101011 | D.54 | 00111011001010 | D.84 | 01010101110010 | D.114 | 01110001010101 |
| D.25 | 00100011110101 | D.55 | 00111011010001 | D.85 | 01010111000110 | D.115 | 01110001101010 |
| D.26 | 00100101011101 | D.56 | 00111011100100 | D.86 | 01010111010001 | D.116 | 01110010011001 |
| D.27 | 00100101111010 | D.57 | 00111110001001 | D.87 | 01011000101110 | D.117 | 01110010100110 |
| D.28 | 00100110110110 | D.58 | 00111110010010 | D.88 | 01011000111001 | D.118 | 01110011001100 |
| D.29 | 00100110111001 | D.59 | 01000011110110 | D.89 | 01011010001101 | D.119 | 01110011010010 |

FIG.17

| | | | | | | | |
|---|---|---|---|---|---|---|---|
| D.120 | 01110011100001 | D.150 | 10001110001101 | D.180 | 10101010010110 | D.210 | 11000001110101 |
| D.121 | 01110100010110 | D.151 | 10001110110010 | D.181 | 10101010101001 | D.211 | 11000011100011 |
| D.122 | 01110100101001 | D.152 | 10001111010100 | D.182 | 10101101001100 | D.212 | 11000100101101 |
| D.123 | 01110110000101 | D.153 | 10010001111100 | D.183 | 10101101010001 | D.213 | 11000100110110 |
| D.124 | 01110110001010 | D.154 | 10010010110110 | D.184 | 10101101100010 | D.214 | 11000101011100 |
| D.125 | 01111000011010 | D.155 | 10010010111001 | D.185 | 10101110000011 | D.215 | 11001010011100 |
| D.126 | 01111000100101 | D.156 | 10010100011011 | D.186 | 10101110100100 | D.216 | 11001011001001 |
| D.127 | 01111001000110 | D.157 | 10010101010101 | D.187 | 10110000101011 | D.217 | 11001011010010 |
| D.128 | 01111001001001 | D.158 | 10010101101010 | D.188 | 10110001001110 | D.218 | 11001011100100 |
| D.129 | 01111010010100 | D.159 | 10010111001100 | D.189 | 10110001110001 | D.219 | 11001100100011 |
| D.130 | 01111100001100 | D.160 | 10010111010010 | D.190 | 10110010011010 | D.220 | 11001110001010 |
| D.131 | 01111100010001 | D.161 | 10010111100001 | D.191 | 10110010100101 | D.221 | 11001110010001 |
| D.132 | 01111100100010 | D.162 | 10011000011110 | D.192 | 10110011001001 | D.222 | 11010000011101 |
| D.133 | 10000011101101 | D.163 | 10011000101101 | D.193 | 10110011010100 | D.223 | 11010000111010 |
| D.134 | 10000011111010 | D.164 | 10011000110011 | D.194 | 10110011100010 | D.224 | 11010001010110 |
| D.135 | 10000101110011 | D.165 | 10011010010101 | D.195 | 10110100001101 | D.225 | 11010001101001 |
| D.136 | 10000110011110 | D.166 | 10011010101010 | D.196 | 10110100110010 | D.226 | 11010010010011 |
| D.137 | 10000110101011 | D.167 | 10011011000011 | D.197 | 10110101100100 | D.227 | 11010010101100 |
| D.138 | 10000110110101 | D.168 | 10011101000110 | D.198 | 10110110000110 | D.228 | 11010011000101 |
| D.139 | 10000111011001 | D.169 | 10011101001001 | D.199 | 10110110010001 | D.229 | 11010011001010 |
| D.140 | 10000111100110 | D.170 | 10100010011101 | D.200 | 10111000011001 | D.230 | 11010100001110 |
| D.141 | 10001001011101 | D.171 | 10100010101110 | D.201 | 10111000100110 | D.231 | 11010100110001 |
| D.142 | 10001001101011 | D.172 | 10100010110011 | D.202 | 10111001000101 | D.232 | 11010101000011 |
| D.143 | 10001001110110 | D.173 | 10100100111100 | D.203 | 10111001010010 | D.233 | 11010110001001 |
| D.144 | 10001011001110 | D.174 | 10100101010110 | D.204 | 10111010001100 | D.234 | 11010110010100 |
| D.145 | 10001011110001 | D.175 | 10100101101001 | D.205 | 10111100001010 | D.235 | 11010110100010 |
| D.146 | 10001100101110 | D.176 | 10100111000101 | D.206 | 10111100010100 | D.236 | 11011000001011 |
| D.147 | 10001100111001 | D.177 | 10100111001010 | D.207 | 10111100100001 | D.237 | 11011000110100 |
| D.148 | 10001101011010 | D.178 | 10101000110101 | D.208 | 11000001011011 | D.238 | 11011001001100 |
| D.149 | 10001101100101 | D.179 | 10101000111010 | D.209 | 11000001101110 | D.239 | 11011001010001 |

FIG.18

| | |
|---|---|
| D.240 | 11011001100010 |
| D.241 | 11011010000110 |
| D.242 | 11011010100001 |
| D.243 | 11011100000101 |
| D.244 | 11011100010010 |
| D.245 | 11100000111001 |
| D.246 | 11100001001101 |
| D.247 | 11100001110010 |
| D.248 | 11100010001011 |
| D.249 | 11100010110100 |
| D.250 | 11100011000110 |
| D.251 | 11100011010001 |
| D.252 | 11100100010101 |
| D.253 | 11100100101010 |
| D.254 | 11100110001100 |
| D.255 | 11100110010010 |
| K.0 | 11100110100001 |
| K.1 | 11101000010011 |
| K.2 | 11101000101100 |
| K.3 | 11101001001010 |
| K.4 | 11101001010100 |
| K.5 | 11101001100001 |
| K.6 | 11101010000101 |
| K.7 | 11101010100010 |
| K.8 | 11101100000110 |
| K.9 | 11101100001001 |

CONVERSION DEVICE, CONVERSION METHOD, REVERSE CONVERSION DEVICE, REVERSE CONVERSION METHOD, AND PROGRAM

TECHNICAL FIELD

The present disclosure relates to a line coding technique in digital communication.

BACKGROUND

A general line code does not have an error correction function, and it is necessary to perform error correction of multiple bits in upper layers of a physical layer and a data link layer. For example, it is difficult to use the 8b/10b line code for bitwise error correction, and a block error correction code such as Reed-Solomon Code is performed on a packet-by-packet basis.

In order to solve this problem, a coding technique of the 4b/10b line code having an error correction function is proposed (Patent Document 1).

RELATED ART DOCUMENT

Patent Document

[Patent Document 1] Japanese Laid-open Patent Application Publication No. 2013-153394

SUMMARY OF THE INVENTION

Problem to be Solved by the Invention

However, with respect to the 4b/10b line code, the coding rate is only 60% in comparison with the 8b/10b line code, and the processing performance degrades. Additionally, in the 4b/10b line code, because 4 bits are converted into 10 bits, the overhead (portion not used for data transmission such as control information) for performing additional work is large, which significantly affects the processing performance. Furthermore, for a code that satisfies constraint conditions required for certain functions, such as embedded clock, DC-balancing, and error detection, only 20 codes can be detected in the 4b/10b line code. Therefore, only the minimum special characters can be assigned as the control information, and it is difficult to implement an additional function such as a handshake sequence.

In view of the above problems, it is an object of the present disclosure to provide a line code that satisfies a predetermined constraint condition.

Means for Solving the Problem

In order to solve the above problem, one aspect of the present disclosure relates to a conversion device including an acquisition unit configured to acquire a first bit string having a first bit length L1; a conversion unit configured to convert, in accordance with conversion information that associates respective bit strings each having the first bit length L1 with bit strings each having a second bit length L2 uniquely assigned to the respective bit strings, the first bit string into a second bit string having the second bit length L2. The conversion information is created by searching for a clique that includes $2^{L1}$ or more nodes, from a graph including nodes and an edge representing the bit strings each having the second bit length L2 that satisfy a predetermined constraint condition.

Effect of the Invention

According to the present disclosure, a line code that satisfies a predetermined constraint condition can be provided.

BRIEF DESCRIPTION OF THE DRAWINGS

FIG. 12 is a diagram illustrating an 8b/14b line code, which is an example according to one embodiment of the present disclosure.

FIG. 13 is a diagram illustrating an 8b/14b line code, which is an example according to one embodiment of the present disclosure.

FIG. 14 is a diagram illustrating an 8b/14b line code, which is an example according to one embodiment of the present disclosure.

FIG. 15 is a diagram illustrating the conversion information according to one embodiment of the present disclosure.

FIG. 16 is a diagram illustrating a conversion table for 8b/14b line coding according to one embodiment of the present disclosure.

FIG. 17 is a diagram illustrating a conversion table for the 8b/14b line coding according to one embodiment of the present disclosure.

FIG. 18 is a diagram illustrating a conversion table for the 8b/14b line coding according to one embodiment of the present disclosure.

DESCRIPTION OF THE EMBODIMENTS

In the following, embodiments of the present invention will be described based on the drawings.

The following embodiments disclose a conversion device that converts a transmission target data into a bit string having a predetermined function such as error correction, and a reverse conversion device that restores a transmitted bit string to original data.

Figure 1:
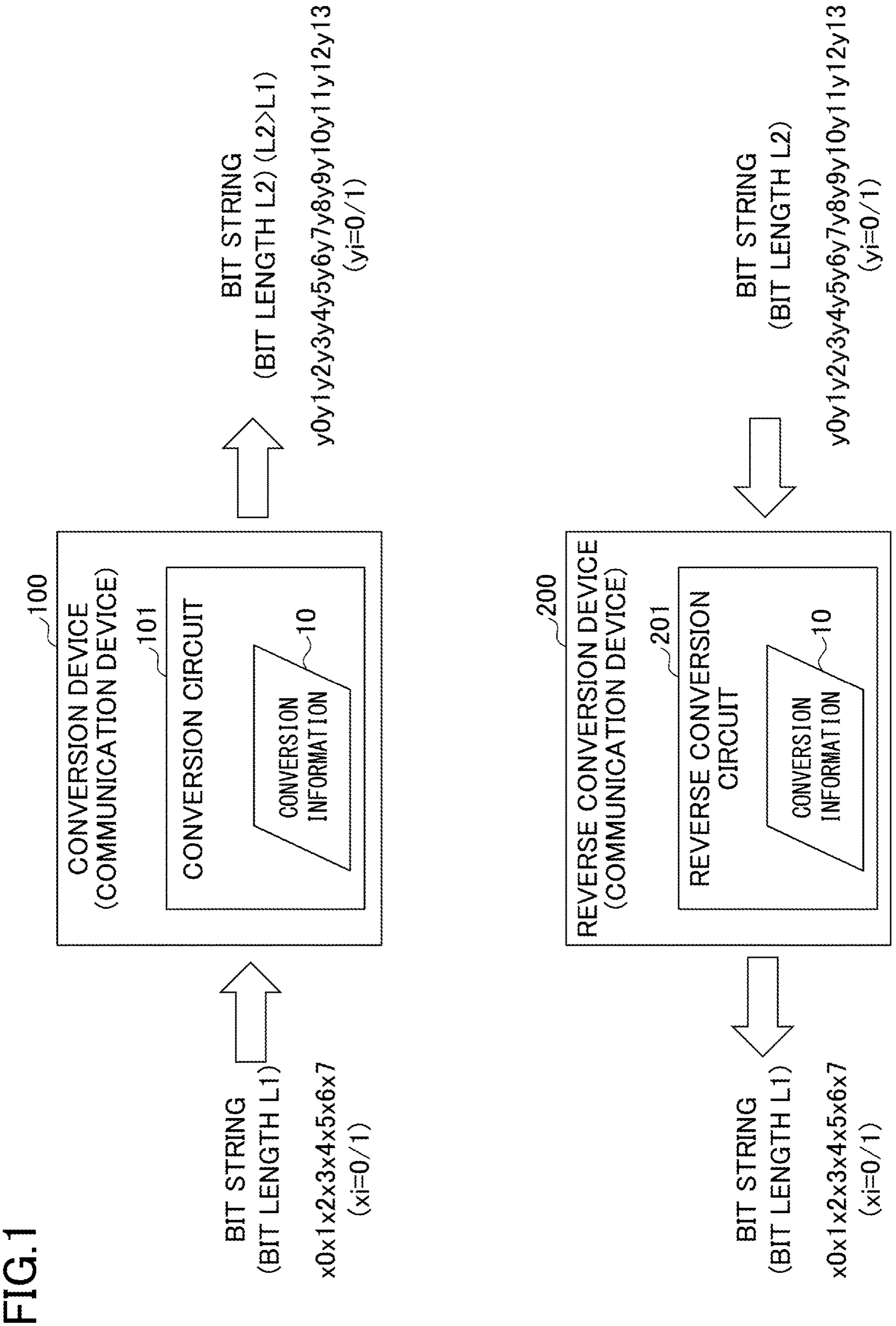
FIG. 1 is a schematic diagram illustrating line coding according to one embodiment of the present disclosure.

To summarize the embodiments described later, as illustrated in FIG. 1, a conversion device 100 according to one embodiment of the present disclosure is a communication device including a conversion circuit (encoder) 101 configured to convert a bit string having a predetermined bit length L1 that constitutes a transmission target data into a bit string having a bit length L2 (>L1) in accordance with conversion information 10 such as a conversion table. The conversion circuit 101 is implemented by hardware logic including, for example, an AND gate, an OR gate, a flip-flop, and the like. Here, the conversion information 10 is stored in advance in a storage area that can be read from the conversion circuit 101, such as a read only memory (ROM), a flip-flop, or a storage device.

In the conversion table according to the following embodiments, respective bit strings each having the bit length L1 are uniquely assigned to bit strings each having the bit length L2 that satisfies a constraint condition to have a predetermined function, such as DC-balancing, clock recovery, error detection, and error correction. For example, in 8b/14b transmission line coding, as illustrated, the conversion device 100 converts an 8-bit bit string "x0x1x2x3x4x5x6x7" (where xi=0/1) into a 14-bit bit string "y0y1y2y3y4y5y6y7y8y9y10y11y12y13" (where yi=0/1) in accordance with the conversion information (conversion table) 10.

A reverse conversion device 200 is a communication device including a reverse conversion circuit (decoder) 201 configured to reversely convert the bit string having the bit length L2 converted by the conversion device 100 into the bit string having the bit length L1 in accordance with the conversion information 10. The reverse conversion circuit 201 is implemented by, for example, hardware logic in substantially the same manner of the conversion circuit 101. Here, the conversion information 10 is stored in advance in a storage area that can be read from the reverse conversion circuit 201, for example. When the reverse conversion circuit 201 receives the 14-bit bit string converted by the conversion circuit 101, the reverse conversion circuit 201 restores the original bit string that has an 8-bit length by using the conversion information 10, for example.

Here, the conversion device 100 may further include the reverse conversion circuit 201. For example, the conversion device 100 may be a communication device including a conversion/reverse conversion circuit (codec) including the conversion circuit 101 and the reverse conversion circuit 201 instead of the conversion circuit 101. Similarly, the reverse conversion device 200 may further include the conversion circuit 101. For example, the reverse conversion device 200 may be a communication device having a conversion/reverse conversion circuit including the conversion circuit 101 and the reverse conversion circuit 201 instead of the reverse conversion circuit 201.

According to the present disclosure, the 8b/14b line coding may use 14-bit bit strings that satisfy the following six constraint conditions, as bit strings after conversion in the conversion information 10:

1) each of the 14-bit bit strings is composed of the equal number of bits of "0" and "1";
2) run lengths of all 14-bit bit strings are 5 or less;
3) the run lengths of all 14-bit bit strings are 7 or less in a 1-bit flip;
4) a run length of a bit string obtained by concatenating two bit strings having the 14-bit length is 5 or less;
5) a run length of a bit string obtained by concatenating two bit strings having the 14-bit length is 11 or less in a 2-bit flip and a distance between two bits to be inverted is 4 bits or greater; and
6) the hamming distance between two bit strings having the 14-bit length is 4 or greater.

Here, the bit string satisfying the above constraint conditions is determined by finding a clique (a complete subgraph) including $2^8$ or more nodes in a graph in which bit strings satisfying the constraint conditions 1) to 3) are nodes and an edge connecting the nodes satisfying the constraint conditions 4) to 6), particularly by finding the maximal clique. As described, by reducing the determining of the bit string satisfying the predetermined constraint conditions to the maximum clique search problem in the graph, a bit string can be efficiently determined.

Figure 2:
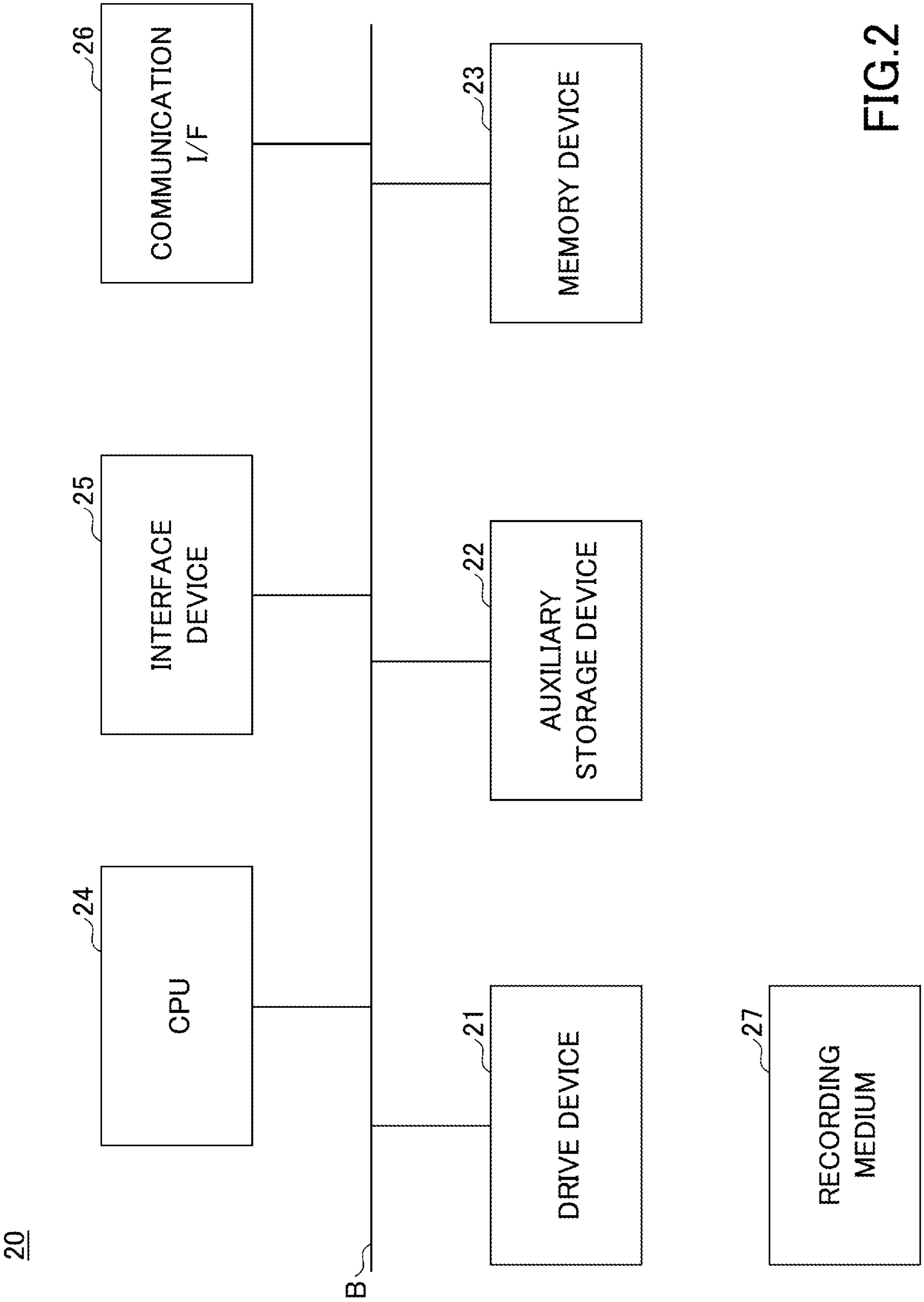
FIG. 2 is a diagram illustrating an example of a hardware configuration of a computer according to one embodiment of the present disclosure.

As another example, the conversion device 100 and the reverse conversion device 200 may have a hardware configuration of a general computer 20 as illustrated in FIG. 2, for example. In this case, the function of the conversion circuit 101 or the reverse conversion circuit 201 of FIG. 1 may be implemented by, for example, a predetermined program executed by the computer 20.

FIG. 2 is a diagram illustrating an example of the hardware configuration of the computer according to one embodiment of the present disclosure. In the example of FIG. 2, the computer 20 includes a drive device 21, an auxiliary storage device 22, a memory device 23, a central processing unit (CPU) 24, an interface device 25, and a communication interface (I/F) 26, which are connected to each other via a bus B.

Various computer programs including a program for implementing various functions and processes, which will be described later, in the conversion device 100 and the reverse conversion device 200 may be provided by a recording medium 27 such as a compact disk-read only memory (CD-ROM). When the recording medium 27 storing the program is set in the drive device 21, the program is installed in the auxiliary storage device 22 from the recording medium 27 via the drive device 21. However, the program does not necessarily have to be installed from the recording medium 27, and may be downloaded from any external device via a network or the like. The auxiliary storage device 22 stores the installed program and also stores necessary files and data, and the like. The memory device 23 reads the program and data from the auxiliary storage device 22 and stores them when a program activation instruction is issued. The CPU 24, which functions as a processor, performs various functions and processes of the conversion device 100 and the reverse conversion device 200, which will be described later, in accordance with the program and various data such as parameters necessary for executing the program stored in the memory device 23. The interface device 25 is used as a communication interface for connecting to a network or an external device. The communication I/F 26 includes a transmission/reception circuit for communicating with an external device.

Here, the communication I/F 26 may be a communication device including the conversion circuit 101 or the reverse conversion circuit 201 of FIG. 1, for example. Additionally, the conversion device 100 and the reverse conversion device 200 are not limited to the above-described hardware configuration, and may be implemented by any other appropriate hardware configuration.

[Conversion Device]

Figure 3:
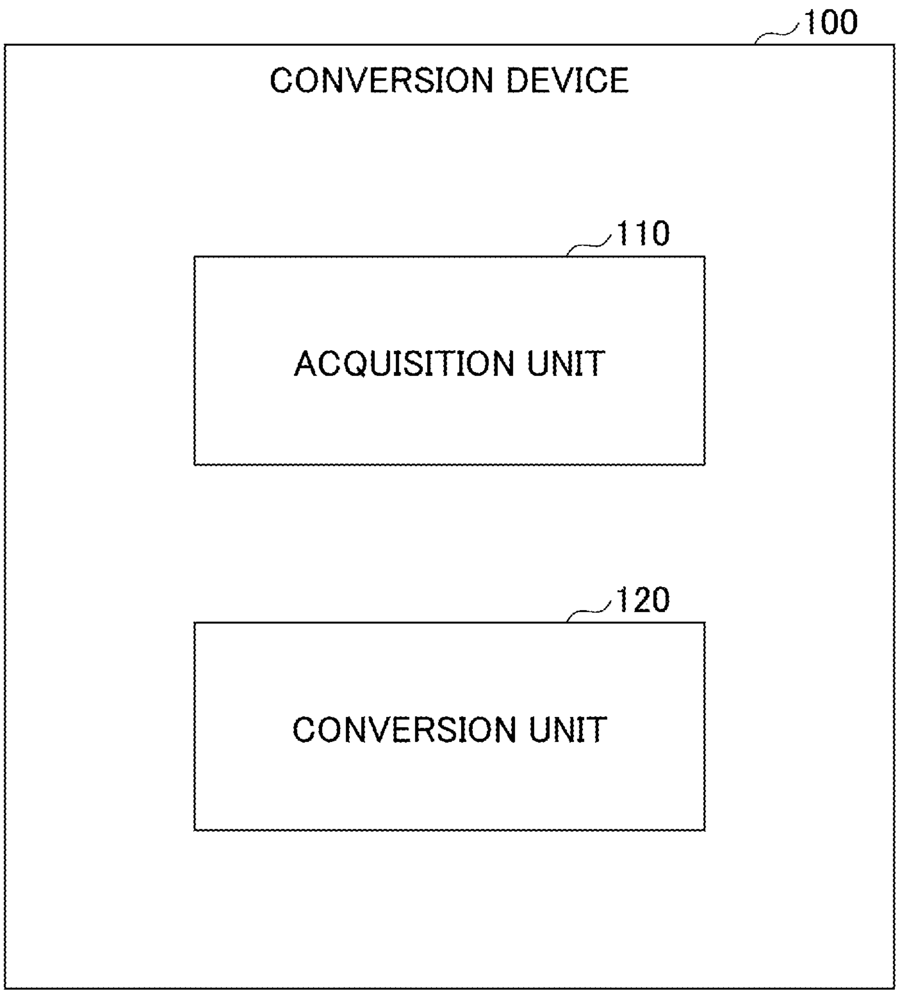
FIG. 3 is a block diagram illustrating a functional configuration of a conversion device according to one embodiment of the present disclosure.
Figure 4:
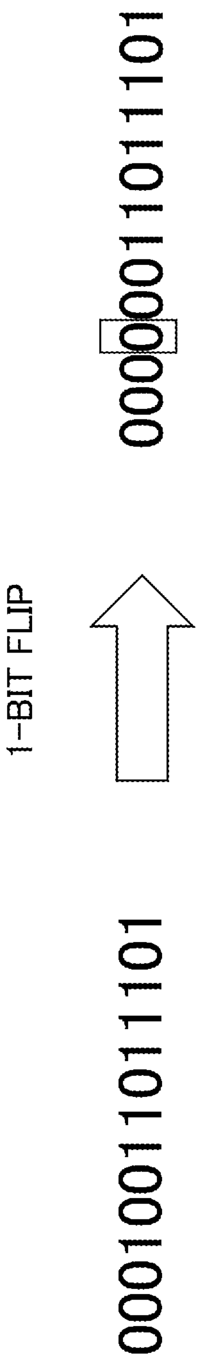
FIG. 4 is a schematic diagram illustrating a 1-bit flip according to one embodiment of the present disclosure.

Next, the conversion device 100 according to one embodiment of the present disclosure will be described with reference to FIGS. 3 to 7. FIG. 3 is a block diagram illustrating a functional configuration of the conversion device 100 according to one embodiment of the present disclosure.

As illustrated in FIG. 3, the conversion device 100 includes an acquisition unit 110 and a conversion unit 120.

The acquisition unit 110 acquires the bit string having the bit length L1 to be transmitted. Specifically, when data is transmitted, the acquisition unit 110 acquires the data, divides the acquired data into bit strings each having the predetermined bit length L1, and passes the bit strings to the conversion unit 120. For example, in the 8b/14b transmission line coding, the acquisition unit 110 divides the data to be transmitted into 8-bit bit strings, and sequentially passes the divided bit strings to the conversion unit 120.

The conversion unit 120 converts the bit string to be converted that is acquired from the acquisition unit 110 into a bit string for transmission having the bit length L2, in accordance with the conversion information 10 that associates respective bit strings each having the bit length L1 with the bit strings each having the bit length L2 uniquely assigned to the respective bit strings. Here, the conversion information 10 is created by searching for a clique including $2^{L1}$ or more nodes in a graph including nodes and edge representing the bit strings each having the bit length L2 that satisfies the predetermined constraint conditions.

A bit string having the bit length L2 having a DC-balancing function, a clock recovery function, and an error detection function and error correction function is used as the conversion information 10.

For example, in the 8b/14b transmission line coding, the conversion information 10 represents a correspondence relationship between respective bit strings each having the 8-bit length and 14-bit bit strings uniquely assigned to the respective bit strings. The 14-bit bit string used as the conversion information 10 satisfies the following six constraint conditions.

1) Each of the bit strings having the 14-bit length is composed of the equal number of bits of “0” and “i”.
2) The run lengths of all bit strings each having the 14-bit length are 5 or less.
3) The run lengths of all bit strings each having the 14-bit length is 7 or less in the 1-bit flip.
4) The run length of the bit string obtained by concatenating two bit strings having the 14-bit length L2 is 5 or less.
5) The run length of the bit string obtained by concatenating two bit strings having the 14-bit length L2 is 11 or less in the 2-bit flip and the distance between two bits to be inverted is 4 bits or greater.
6) The hamming distance between two bit strings having the second bit length L2 is 4 or greater.

The constraint condition 1) relates to the DC balancing function, the constraint conditions 2) to 5) relate to the clock recovery function, and the constraint condition 6) relates to the error detection function and error correction function. Here, the importance of the code is clock recovery function>DC balancing function>=error detection function and error correction function.

That is, the 14-bit bit string having the DC balancing function is composed of the equal number of bits “0” and “1”.

Additionally, the run lengths of all the 14-bit bit strings having the clock recovery function, that is, the maximum lengths of consecutive 0s or 1s are 5 or less.

Further, the run lengths of all the 14-bit bit strings having the clock recovery function is 7 or less in the 1-bit flip. That is, even if any one bit of the bit string is inverted, the run length of the resultant bit string is 12 or less. For example, in the bit string “00010011011101” illustrated in FIG. 4, even if the fourth bit “0” from the most significant bit is inverted to “1”, the run length of the resultant bit string “00000011011101” is 6, which is 7 or less.

Figure 5:
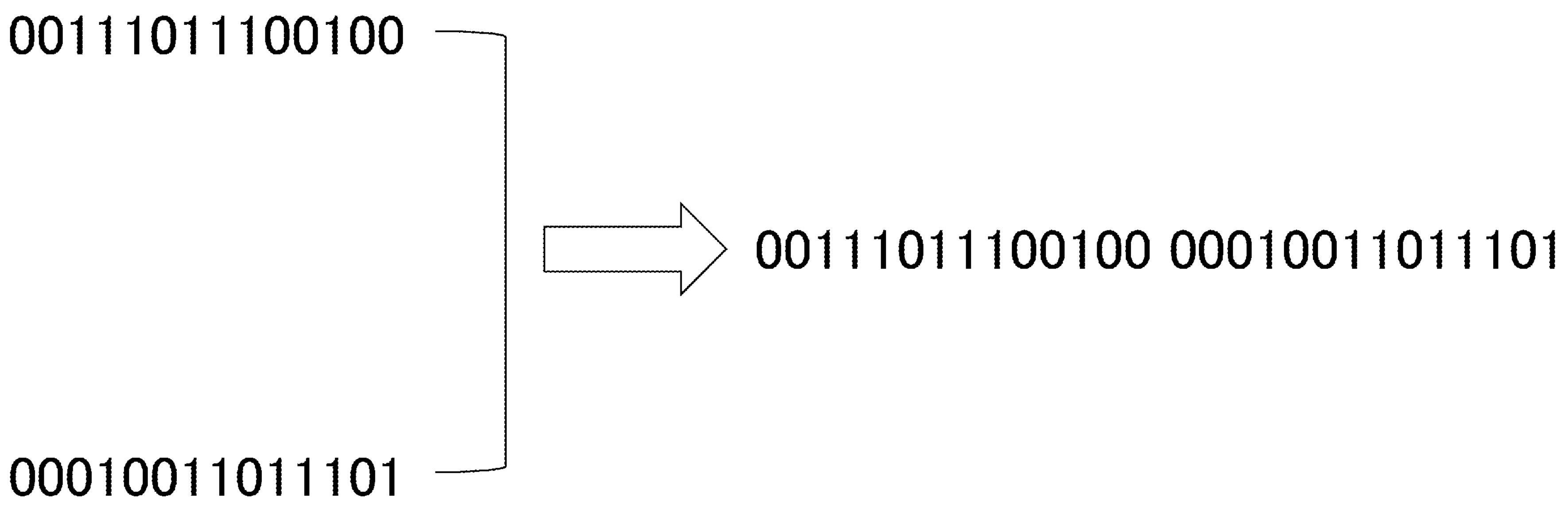
FIG. 5 is a schematic diagram illustrating concatenation of bit strings according to one embodiment of the present disclosure.
Figure 6:
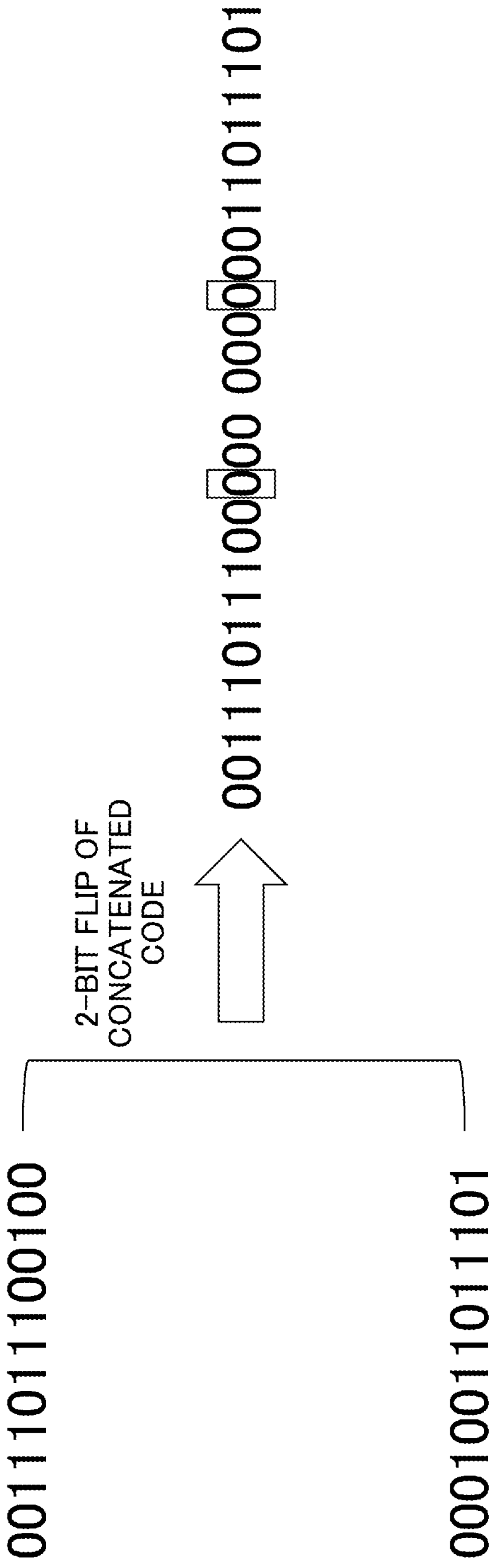
FIG. 6 is a schematic diagram illustrating a 2-bit flip of a concatenated bit string according to one embodiment of the present disclosure.

Further, the run length of the bit string obtained by concatenating two 14-bit bit strings having the clock recovery function is 5 or less. For example, the run length of the bit string “0011101110010000010011011101” obtained by concatenating the two bit strings “00111011100100” and “00010011011101” illustrated in FIG. 5 is 5, which is 5 or less.

Further, the run length of the bit string obtained by concatenating two 14-bit bit strings having the clock recovery function is 9 or less in the 2-bit flip in which the distance between two inverted bits is set to 4 bits or greater. That is, even if any two bits of the concatenated bit string are inverted, the run length of the resultant bit string is 12 or less. For example, in the bit string “0011101110000000000011011101” obtained by concatenating the two bit strings “00111011100100” and “00010011011101” illustrated in FIG. 6, even if the two bits, which are the twelfth bit from the most significant bit and the eighteenth bit separated from the twelfth bit by four or more bits, are inverted, the run length of the resultant bit string “0011101110000000000011011101” is 11, which is 11 or less.

Figure 7:
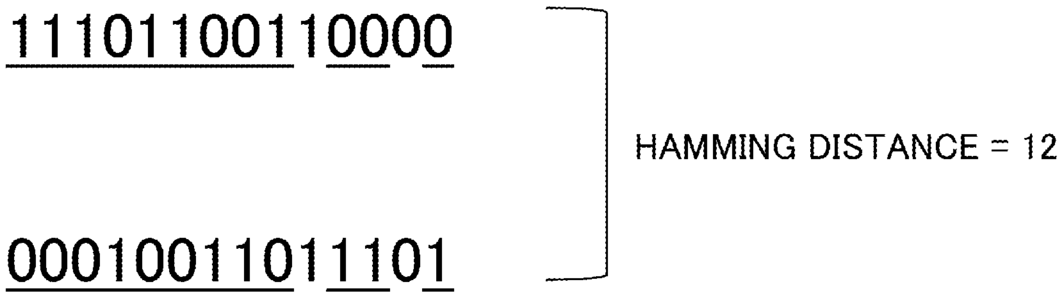
FIG. 7 is a schematic diagram illustrating a hamming distance of bit strings according to one embodiment of the present disclosure.

Additionally, the hamming distance between two 14-bit bit strings having the error detection function and error correction function is 4 or greater. For example, the hamming distance of the two bit strings “11101100110000” and “00010011011101” illustrated in FIG. 7 is 12, which is 4 or greater.

Here, the conversion information 10 described above relates to the 8b/14b line coding that achieves the DC-balancing function, the clock recovery function, the error detection function and correction function, but the conversion information 10 according to the present disclosure is not limited thereto. For example, more generally, for L1b/L2b line coding, when L3 is a constant related to the run length, L4 is a constant related to the bit invert distance, and L5 is a constant related to the hamming distance, the following conditions may be used:

1) each of the bit strings is composed of the equal number of bits of “0” and “1”;
2) the run lengths of all bit strings are L3 or less;
3) the run lengths of all bit strings are L3 or less in the 1-bit flip;
4) the run length of the bit string obtained by concatenating two bit strings is L3 or less;
5) the run length of the bit string obtained by concatenating two bit strings is L3 or less in the 2-bit flip in which bits are separated by L4 or more, and a distance between two bits to be inverted is L5 bits or greater; and
6) the hamming distance between two bit strings is L5 or greater. At this time, L3, L4, and L5 are less than or equal to L2 at the maximum. When L1 and L2 are fixed, it is preferable that L3 and L4 are smaller and L5 is larger in view of the nature of the line code. That is, as L3 becomes smaller, the clock is easily recovered from the bit signal, and as L4 becomes smaller, the tolerance of the clock recovery to bit errors increases. As L5 becomes larger, the number of bit errors that can be corrected and detected increases, because the magnitude of L5 is directly related to the strength of the code correction function. However, as these conditions are more strongly applied, the size of the maximum clique that is found decreases, and a trade-off relationship exists. Therefore, L3 to L5 may be appropriately selected after L1 and L2 are determined.

[Conversion Process]

Figure 8:
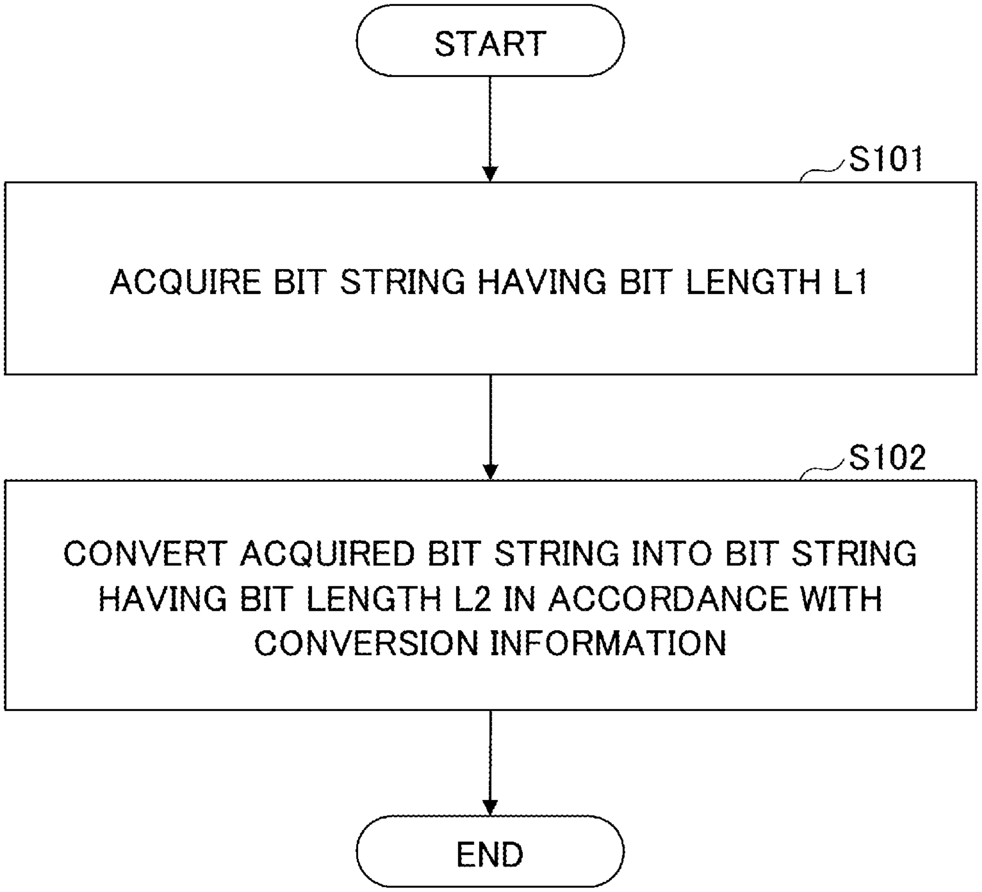
FIG. 8 is a flowchart illustrating a conversion process according to one embodiment of the present disclosure.

Next, a conversion process according to one embodiment of the present disclosure will be described with reference to FIG. 8. FIG. 8 is a flowchart illustrating the conversion process according to one embodiment of the present disclosure. This process indicates an example of the conversion process performed by the conversion device 100 described with reference to FIG. 3.

As illustrated in FIG. 8, in step S101, the conversion device 100 acquires a bit string having the bit length L1. For example, when the conversion device 100 acquires the transmission target data, the conversion device 100 divides the acquired transmission target data into bit strings each having the bit length L1.

In step S102, the conversion device 100 converts each of the bit strings into a bit string having the bit length L2 in accordance with the conversion information 10. The conversion information 10 is created by searching for a clique including $2^{L1}$ or more nodes in a graph including the nodes and the edge representing the bit strings each having the bit length L2 that satisfy the predetermined constraint conditions.

Here, the predetermined constraint conditions are for adding the DC-balancing function, the clock recovery function, and the error detection function and error correction function to the bit string having the bit length L1. For example, in the 8b/14b line coding, the predetermined constraint conditions may include:

1) each of the bit strings each having the bit length L2 is composed of the equal number of bits "0" and "1";
2) the run lengths of all the bit strings each having the bit length L2 are 5 or less;
3) the run lengths of all the bit strings each having the bit length L2 are 7 or less in the 1-bit flip;
4) the run length of the bit string obtained by concatenating two bit strings each having the bit length L2 is 5 or less;
5) the run length of the bit string obtained by concatenating two bit strings each having the bit length L2 is 11 or less in the 2-bit flip and the distance between two bits to be inverted is 4 bits or greater; and
6) the hamming distance between two bit strings each having the bit length L2 is 4 or greater.

The bit string having the bit length L2 converted by the conversion device 100 is transmitted to a transmission destination of the transmission target data.

[Reverse Conversion Device]

Figure 9:
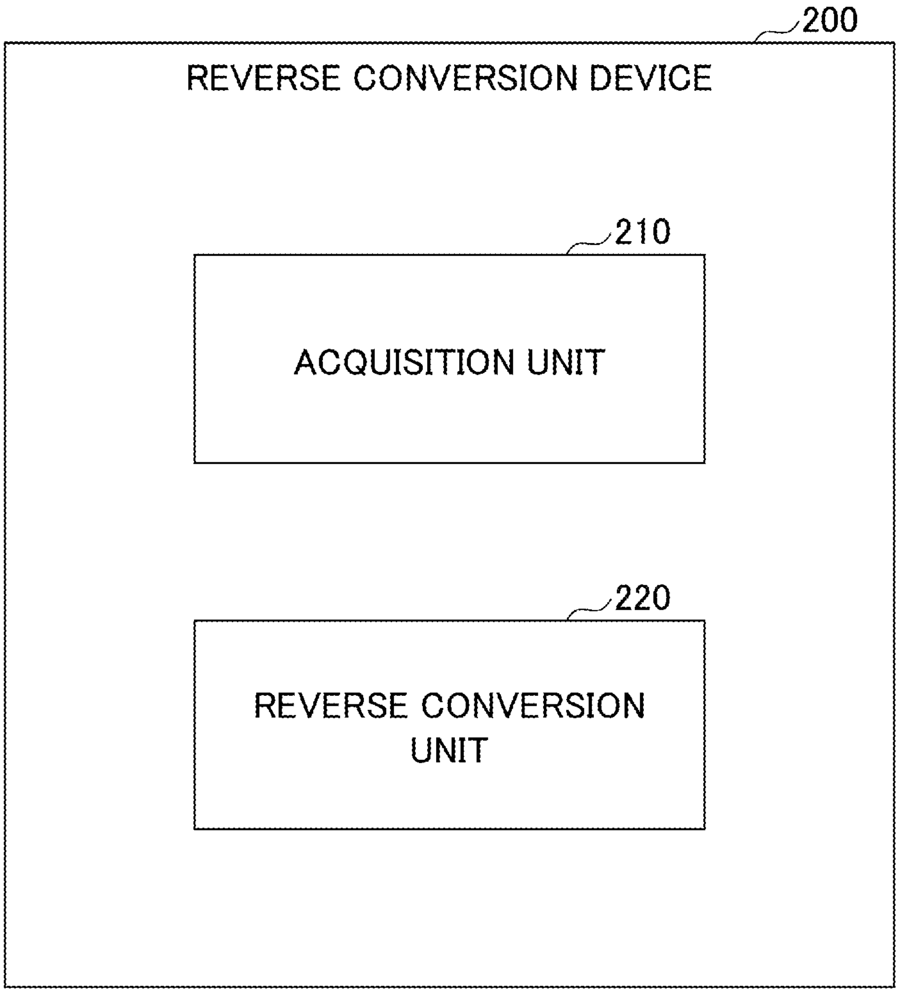
FIG. 9 is a block diagram illustrating a functional configuration of a reverse conversion device according to one embodiment of the present disclosure.

Next, the reverse conversion device 200 according to one embodiment of the present disclosure will be described with reference to FIG. 9. The reverse conversion device 200 acquires the bit string having the bit length L2 converted by the conversion device 100 and restores the acquired bit string to the bit string having the bit length L1 in accordance with the conversion information 10. FIG. 9 is a block diagram illustrating a functional configuration of the reverse conversion device 200 according to one embodiment of the present disclosure.

As illustrated in FIG. 9, the reverse conversion device 200 includes an acquisition unit 210 and a reverse conversion unit 220.

The acquisition unit 210 acquires the bit string having the bit length L2. Specifically, the acquisition unit 210 acquires the bit string having the bit length L2 converted by the conversion device 100 from the bit string having the bit length L1 representing the transmission target data. For example, in the 8b/14b line coding, the acquisition unit 210 acquires the 14-bit bit string.

The reverse conversion unit 220 reversely converts the acquired bit string into the bit string having the bit length L1 in accordance with the conversion information 10 that associates the respective bit strings each having the bit length L1 with the bit strings each having the bit length L2 uniquely assigned to the respective bit strings. As described above, the conversion information 10 is created by searching for the clique including $2^{L1}$ or more nodes in the graph including the nodes and the edge representing the bit strings each having the bit length L2 that satisfy the predetermined constraint conditions. For example, in the 8b/14b line coding, the reverse conversion unit 220 reversely converts the acquired 14-bit bit string into a corresponding 8-bit bit string in accordance with the conversion information 10. The restored bit strings are combined to restore the transmission target data.

[Reverse Conversion Process]

Figure 10:
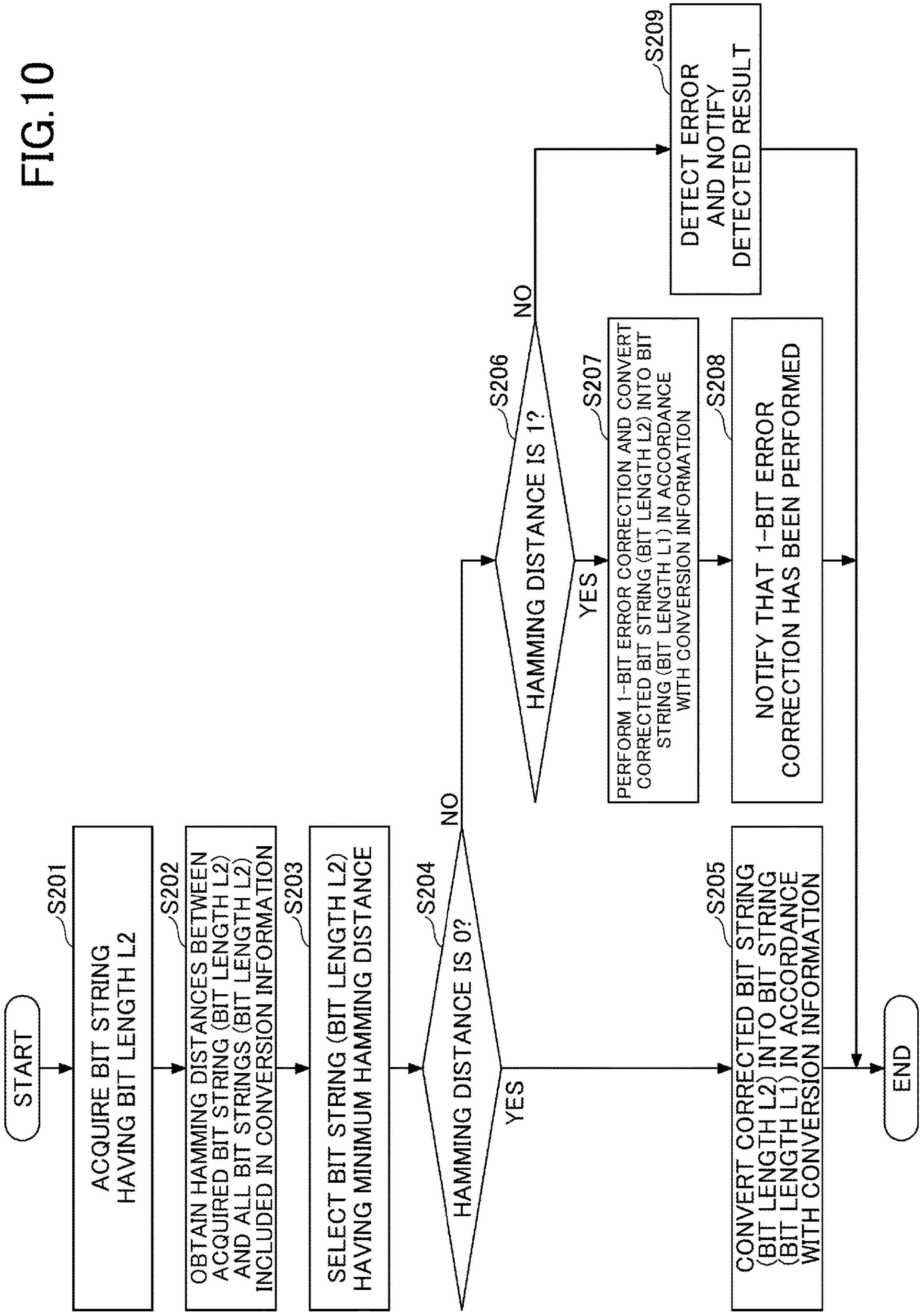
FIG. 10 is a flowchart illustrating a reverse conversion process according to one embodiment of the present disclosure.

Next, a reverse conversion process according to one embodiment of the present disclosure will be described with reference to FIG. 10. FIG. 10 is a flowchart illustrating the reverse conversion process according to one embodiment of the present disclosure. This process indicates an example of the reverse conversion process performed by the reverse conversion device 200 described with reference to FIG. 9.

As illustrated in FIG. 10, in step S201, the acquisition unit 210 of the reverse conversion device 200 acquires the bit string having the bit length L2. For example, in the 8b/14b line coding, the reverse conversion device 200 acquires the 14-bit bit string.

In step S202, the reverse conversion unit 220 of the reverse conversion device 200 calculates the hamming distances between the bit string (the bit length L2) acquired by the acquisition unit 210 and all the bit strings (the bit length L2) included in the conversion information 10.

In step S203, the reverse conversion unit 220 selects a bit string (the bit length L2) having the minimum hamming distance included in the conversion information 10.

In step S204, the reverse conversion unit 220 determines whether the minimum hamming distance is 0. If the minimum hamming distance is 0, the reverse conversion unit 220 causes the process to transition to step S205. If the minimum hamming distance is not 0, the reverse conversion unit 220 causes the process to transition to step S206.

When the process transitions to step S205, the reverse conversion unit 220 converts the bit string (the bit length L2) selected in step S203 into a bit string (the bit length L1) in accordance with the conversion information 10. For example, in the 8b/14b transmission line coding, the reverse conversion unit 220 converts the 14-bit bit string into the 8-bit bit string.

If the process transitions from step S204 to step S206, the reverse conversion unit 220 determines whether the minimum hamming distance is 1. If the minimum hamming distance is 1, the reverse conversion unit 220 causes the process to transition to step S207. If the minimum hamming distance is not 1, the reverse conversion unit 220 causes the process to transition to step S209.

When the process transitions to step S207, the reverse conversion unit 220 performs 1-bit error correction on the bit string (the bit length L2) acquired in step S201, and converts the corrected bit string (the bit length L2) into a bit string (the bit length L1) in accordance with the conversion information 10. For example, in the 8b/14b line coding, because the hamming distance of arbitrary codes (symbols) is 4 or greater, when what is called a 1-bit error, in which 1 bit in 14 bits is inverted, occurs, there is only one symbol that has a hamming distance different by 1 for matching. Therefore, when the hamming distance is 1, the 1-bit error correction is possible. Here, when the hamming distance is 1, as described above, there is one symbol that has a hamming distance different by 1 for matching, and thus the reverse conversion unit 220 may convert the bit string (the bit length L2) selected in step S203 into the bit string (the bit length L1).

In step S208, the reverse conversion unit 220 notifies the upper layer that the 1-bit error correction has been performed. For example, the reverse conversion unit 220 outputs, to the CPU or the like, an interrupt signal (correct error) indicating that the 1-bit error correction has been performed.

If the process transitions from step S206 to step S209, the reverse conversion unit 220 performs error detection on the bit string acquired in step S201 and notifies a detection result. For example, when a 2-bit error occurs during communication, the minimum hamming distance value becomes 2, and in this case, the hamming distances of multiple bit strings (the bit length L2) included in the conversion information 10 can be 2. That is, error detection can be performed, although error correction cannot be performed because multiple bit strings (the bit length L2) are matched. Here, when an error of three or more bits occurs during communication, the error can be detected or cannot be detected. (There is a possibility that the bit string may erroneously match with another bit string.)

Additionally, the reverse conversion unit 220 notifies the upper layer of the detection result detected by the error detection. For example, the reverse conversion unit 220 outputs an interrupt signal indicating that an error has been detected (a fatal error) to the CPU or the like.

By the process of FIG. 10, the reverse conversion device 200 can reversely convert the bit string having the bit length L2 (the bit length L2) converted by the conversion device 100 into the transmission target data (the bit string having the bit length L1). Additionally, the reverse conversion device 200 according to the present embodiment has a feature that the error detection and correction can be performed even with the line code. For example, in the 8b/14b line code, the reverse conversion device 200 can detect an error of 2 bits or less that occurs during transmission and correct an error of 1 bit.

<Method of Creating Conversion Information>

Subsequently, a method of creating the conversion information 10 will be described. In the present disclosure, in order to extract a bit string that satisfies the predetermined constraint conditions 1) to 6), the computer 20 as illustrated in FIG. 2 executes a predetermined program (a conversion information creation program) to perform, for example, a process of creating the conversion information as illustrated in FIG. 11.

In the 8b/14b line code, the predetermined constraint conditions may include:

1) each of the bit strings each having the bit length L2 is composed of the equal number of bits "0" and "1";
2) the run lengths of all the bit strings each having the bit length L2 are 5 or less;
3) the run lengths of all the bit strings each having the bit length L2 are 7 or less in the 1-bit flip;
4) the run length of the bit string obtained by concatenating two bit strings each having the bit length L2 is 5 or less;
5) the run length of the bit string obtained by concatenating two bit strings each having the bit length L2 is 11 or less in the 2-bit flip and the distance between two bits to be inverted is 4 bits or greater; and
6) the hamming distance between two bit strings each having the bit length L2 is 4 or greater.

Figure 11:
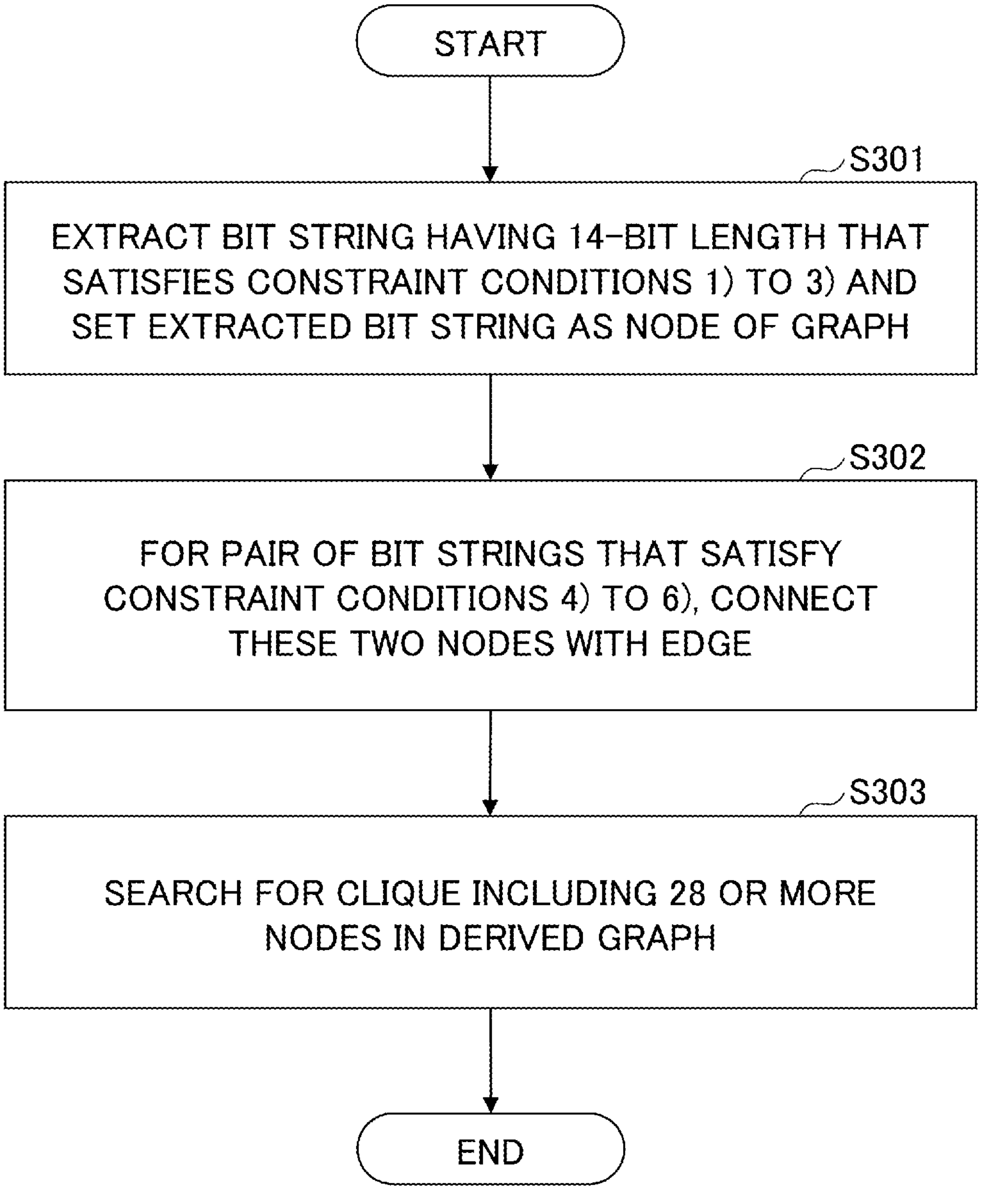
FIG. 11 is a flowchart illustrating a process of creating conversion information according to one embodiment of the present disclosure.

FIG. 11 is a flowchart illustrating the process of creating the conversion information according to one embodiment of the present disclosure. This process indicates an example of the process of creating the conversion information, which is performed when the computer 20 executing the predetermined program creates the conversion information 10.

In step S301, in the 8b/14b line coding, the computer 20 first extracts a 14-bit bit string that satisfies the above constraint conditions 1) to 3), and sets the extracted bit string as a node of a graph.

In step S302, with respect to a pair of bit strings that satisfy the constraints 4) to 6) for the extracted bit strings, the computer 20 connects these two nodes by an edge. This derives a graph including the nodes representing bit strings that satisfy the constraint conditions 1) to 3) and the edge connecting the pair of nodes that satisfy the constraint conditions 4) to 6) among the nodes.

In step S303, the computer 20 searches for a clique including 23 or more nodes in the graph derived in step S302. The bit string corresponding to the node of the extracted clique satisfies the constraint conditions 1) to 6).

Preferably, the computer 20 searches for a clique including the maximum number of nodes, that is, the maximum clique, so that more transmission control codes such as special characters can be used in addition to 28 8-bit bit strings of the conversion target. With respect to the maximal clique search problem in the graph, several known algorithms are known (e.g., Tomita's MCT algorithm, Battitti and Protasi's Reactive Local Search meta-heuristic based algorithm, and the like), and any of the maximal clique search algorithms may be employed.

Here, the MCT algorithm finds an exact solution, whereas the Reactive Local Search algorithm finds an approximate solution. In the maximum clique problem, as the scale of the problem increases, the required computation time exponentially increases. Thus, in practice, the Reactive Local Search algorithm, which approximately finds the maximum clique, can be used in the computation of the 8b/14b line code. Here, for the sake of simplicity, hereinafter, the exact solution and the approximate solution of the maximum clique are referred to as the maximum clique.

When the Reactive Local Search algorithm is applied to the 8b/14b line coding, 266 bit strings in FIGS. 12 to 14 are extracted. Among the 266 bit strings, 256 bit strings are uniquely assigned to the 8-bit bit string of the conversion target, and the remaining 10 bit strings are used as special characters for transmission control. When the 266 bit strings are assigned as described, a conversion table as illustrated in FIG. 15 can be obtained. By converting the 8-bit bit string of the transmission target into the 14-bit bit string in accordance with the conversion table, the DC balancing function, the clock recovery function, and the error detection function and error correction function can be added. For each of the bit strings, the run length of the single code is 5, and the run length across arbitrary codes is also 5, and the clock recovery performance is improved tremendously. Additionally, the run length is 7 when a 1-bit error occurs in the code, and the run length is 8 when a 1-bit error occurs in a code obtained by concatenating two arbitrary codes.

The code by the 8b/14b line code found and detected as described has the following characteristics.

1) Clock Recovery Performance

When there is no bit error, the run length in the code is 5.

When there is no bit error, the run length is 5 even across arbitrary codes.

That is, when there is no error, the number of consecutive 0s or 1s is always 5 or less in an arbitrary bit string.

2) DC Balance Performance

When there is no bit error, the number of 0s and the number of 1s in the code are always identical (7 bits among 14 bits).

3) Error Detection and Correction Function

Error correction is possible if any one bit in the code is corrupted.

Error detection is possible if any two bits in the code are corrupted.

The following are characteristics at the time of the error.

For any one bit error, the run length in the code is always 7 or less.

For any one bit error, the run length even across any codes is always 8 or less.

For any 2-bit bit error, the run length even across any codes is always 11 or less, when the bit errors are separated by 4 or more bits.

Additionally, the number of control codes (K codes) is 10.

Example of Conversion Information

In the 8b/14b line coding, the conversion device 100 and the reverse conversion device 200 hold the conversion table (an example of the conversion information 10) as illustrated in FIGS. 16 to 18, for example, and can perform coding and decoding using the conversion table. Each of the bit strings of the illustrated conversion table is assigned to D.X (X=0 to 255) data corresponding to the bit string of 8 bits and K.Y (Y=0 to 9) codes. Here, the illustrated assignment is merely an example, and the conversion table according to the present disclosure is not limited thereto.

By using this code table, any 8-bit (0 to 255) data and 10 types of K codes can be converted into 14b. For example, 128 in 8-bit is converted into 14 bits "01111001001001" corresponding to D.128 in the conversion table. Similarly, the control code K.7 is converted into 14 bits "11101010100010". The reverse conversion device 200 calculates all of the hamming distances between the 14-bit data to be converted (generally, received 14-bit data) and all the 14b codes of the code table, and if there is a code having a hamming distance of 0 (that is, if there is a 14b that completely matches), it is determined that there is no error, and the code is selected. If there is no code having a hamming distance of 0 (the code that completely matches), and if there is a code having a hamming distance of 1, it is determined that the 1-bit error is corrected, and the code is selected. (Only one code having a hamming distance of 1 can be present.) If other than the above, an error is detected.

Although the embodiments of the present invention have been described in detail, the present invention is not limited to the above-described specific embodiments, and various modifications and changes can be made within the scope of the spirit of the present invention described in the claims.

This application claims priority to Japanese Patent Application No. 2021-166735 filed on Oct. 11, 2021, the entire contents of which are incorporated herein by reference.

DESCRIPTION OF REFERENCE SYMBOLS

10 conversion information
100 conversion device
110 acquisition unit
120 conversion unit
200 reverse conversion device
210 acquisition unit
220: reverse conversion unit

The invention claimed is:

1. A conversion device comprising:

circuitry configured to:

acquire a first bit string having a first bit length L1; and convert, in accordance with conversion information that associates respective bit strings each having the first bit length L1 with bit strings each having a second bit length L2 uniquely assigned to the respective bit strings, the first bit string into a second bit string having the second bit length L2, wherein the conversion information is created by searching for a clique that includes $2^{L1}$ or more nodes, from a graph including nodes and an edge representing the bit strings each having the second bit length L2 that satisfy a predetermined constraint condition.

2. The conversion device as claimed in claim 1, wherein when the first bit length L1 is 8 and the second bit length L2 is 14, the predetermined constraint condition includes 1) Each of the bit strings each having the second bit length L2 is composed of an equal number of bits "0"'s and "1" s, 2) Run lengths of all of the bit strings each having the second bit length L2 are 5 or less, 3) The run lengths of all of the bit strings each having the second bit length L2 are 7 or less in a 1-bit flip, 4) A run length of a bit string obtained by concatenating two bit strings each having the second bit length L2 is 5 or less, 5) A run length of a bit string obtained by concatenating two bit strings each having the second bit length L2 is 11 or less in a 2-bit flip, and a distance between two bits to be inverted is 4 or greater, and 6) A hamming distance between two bit strings each having the second bit length L2 is 4 or greater.

3. The conversion device as claimed in claim 2, wherein the conversion information is created by searching for the clique that includes the 211 or more nodes from the graph.

4. The conversion device as claimed in claim 3, wherein the clique includes a node group of 266 nodes corresponding to bit strings below:

TABLE 1

| | | | |
|---|---|---|---|
| 00010011011101 | 00100111010011 | 01000011111001 | 01011010110010 |
| 00010011101110 | 00100111101100 | 01000101101011 | 01011101001010 |
| 00010011110011 | 00101001101110 | 01000110011101 | 01011101010100 |
| 00010101011110 | 00101001111001 | 01000110101110 | 01011101100001 |
| 00010101111001 | 00101011001101 | 01000110110011 | 01011110000011 |
| 00010110101101 | 00101011110010 | 01000111011010 | 01011110100100 |
| 00010110111010 | 00101100011110 | 01000111100101 | 01100001111100 |
| 00010111001011 | 00101100101101 | 01001001011110 | 01100010101101 |
| 00010111110100 | 00101100110011 | 01001001101101 | 01100010111010 |

TABLE 1-continued

| | | | |
|---|---|---|---|
| 00011001110101 | 00101101001011 | 01001001110011 | 01100100011011 |
| 00011001111010 | 00101101110100 | 01001011010101 | 01100101001110 |
| 00011010011011 | 00101110010101 | 01001011101010 | 01100101110001 |
| 00011010111100 | 00101110101010 | 01001100110101 | 01100111001001 |
| 00011011010110 | 00101111000110 | 01001100111010 | 01100111010100 |
| 00011011101001 | 00101111100001 | 01001101011001 | 01100111100010 |
| 00011100011101 | 00110001011011 | 01001101100110 | 01101000011101 |
| 00011100101011 | 00110001101101 | 01001110010110 | 01101000101011 |
| 00011100110110 | 00110001110110 | 01001110101001 | 01101000110110 |
| 00011101010011 | 00110100101110 | 01001111001100 | 01101010001110 |
| 00011101101100 | 00110100110101 | 01010010011110 | 01101010110001 |
| 00011110001110 | 00110110011100 | 01010010101011 | 01101011000011 |
| 00011110110001 | 00110110100011 | 01010010110101 | 01101101000101 |
| 00011111000101 | 00111001011100 | 01010100111100 | 01101101010010 |
| 00100011011110 | 00111001100011 | 01010101001101 | 01110000110011 |
| 00100011101011 | 00111011001010 | 01010101110010 | 01110001010101 |
| 00100011110101 | 00111011010001 | 01010111000110 | 01110001101010 |
| 00100101011101 | 00111011100100 | 01010111010001 | 01110010011001 |
| 00100101111010 | 00111110001001 | 01011000101110 | 01110010100110 |
| 00100110110110 | 00111110010010 | 01011000111001 | 01110011001100 |
| 00100110111001 | 01000011110110 | 01011010001101 | 01110011010010 |

TABLE 2

| | | | |
|---|---|---|---|
| 01110011100001 | 10001110001101 | 10101010010110 | 11000001110101 |
| 01110100010110 | 10001110110010 | 10101010101001 | 11000011100011 |
| 01110100101001 | 10001111010100 | 10101101001100 | 11000100101101 |
| 01110110000101 | 10010001111100 | 10101101010001 | 11000100110110 |
| 01110110001010 | 10010010110110 | 10101101100010 | 11000101011100 |
| 01111000011010 | 10010010111001 | 10101110000011 | 11001010011100 |
| 01111000100101 | 10010100011011 | 10101110100100 | 11001011001001 |
| 01111001000110 | 10010101010101 | 10110000101011 | 11001011010010 |
| 01111001001001 | 10010101101010 | 10110001001110 | 11001011100100 |
| 01111010010100 | 10010111001100 | 10110001110001 | 11001100100011 |
| 01111100001100 | 10010111010010 | 10110010011010 | 11001110001010 |
| 01111100010001 | 10010111100001 | 10110010100101 | 11001110010001 |
| 01111100100010 | 10011000011110 | 10110011001001 | 11010000011101 |
| 10000011101101 | 10011000101101 | 10110011010100 | 11010000111010 |
| 10000011111010 | 10011000110011 | 10110011100010 | 11010001010110 |
| 10000101110011 | 10011010010101 | 10110100001101 | 11010001101001 |
| 10000110011110 | 10011010101010 | 10110100110010 | 11010010010011 |
| 10000110101011 | 10011011000011 | 10110101100100 | 11010010101100 |
| 10000110110101 | 10011101000110 | 10110110000110 | 11010011000101 |
| 10000111011001 | 10011101001001 | 10110110010001 | 11010011001010 |
| 10000111100110 | 10100010011101 | 10111000011001 | 11010100001110 |
| 10001001011101 | 10100010101110 | 10111000100110 | 11010100110001 |
| 10001001101011 | 10100010110011 | 10111001000101 | 11010101000011 |
| 10001001110110 | 10100100111100 | 10111001010010 | 11010110001001 |
| 10001011001110 | 10100101010110 | 10111010001100 | 11010110010100 |
| 10001011110001 | 10100101101001 | 10111100001010 | 11010110100010 |
| 10001100101110 | 10100111000101 | 10111100010100 | 11011000001011 |
| 10001100111001 | 10100111001010 | 10111100100001 | 11011000110100 |
| 10001101011010 | 10101000110101 | 11000001011011 | 11011001001100 |
| 10001101100101 | 10101000111010 | 11000001101110 | 11011001010001 |

TABLE 3

| |
|---|
| 11011001100010 |
| 11011010000110 |
| 11011010100001 |
| 11011100000101 |
| 11011100010010 |
| 11100000111001 |
| 11100001001101 |
| 11100001110010 |
| 11100010001011 |
| 11100010110100 |
| 11100011000110 |
| 11100011010001 |
| 11100100010101 |
| 11100100101010 |
| 11100110001100 |
| 11100110010010 |
| 11100110100001 |
| 11101000010011 |

TABLE 3-continued

| |
|---|
| 11101000101100 |
| 11101001001010 |
| 11101001010100 |
| 11101001100001 |
| 11101010000101 |
| 11101010100010 |
| 11101100000110 |
| 11101100001001. |

5. The conversion device as claimed in claim 4, wherein bit strings corresponding to 256 nodes of the node group are uniquely assigned to the respective bit strings each having the first bit length L1, and wherein bit strings corresponding to remaining ten nodes of the node group are used for transmission control.

6. A conversion method comprising:

acquiring, by one or more processors, a first bit string having a first bit length L1; and converting, by the one or more processors, in accordance with conversion information that associates respective bit strings each having the first bit length L1 with bit strings each having a second bit length L2 uniquely assigned to the respective bit strings, the first bit string into a second bit string having the second bit length L2, wherein the conversion information is created by searching for a clique that includes $2^{L1}$ or more nodes, from a graph including nodes and an edge representing the bit strings each having the second bit length L2 that satisfy a predetermined constraint condition.

7. The conversion method as claimed in claim 6, wherein when the first bit length L1 is 8 and the second bit length L2 is 14, the predetermined constraint condition includes 1) Each of the bit strings each having the second bit length L2 is composed of an equal number of bits “0”’s and “1”s, 2) Run lengths of all of the bit strings each having the second bit length L2 are 5 or less, 3) The run lengths of all of the bit strings each having the second bit length L2 are 7 or less in a 1-bit flip, 4) A run length of a bit string obtained by concatenating two bit strings each having the second bit length L2 is 5 or less, 5) A run length of a bit string obtained by concatenating two bit strings each having the second bit length L2 is 11 or less in a 2-bit flip, and a distance between two bits to be inverted is 4 or greater, and 6) A hamming distance between two bit strings each having the second bit length L2 is 4 or greater.

8. The conversion method as claimed in claim 7, wherein the conversion information is created by searching for the clique that includes the 211 or more nodes from the graph.

9. The conversion method as claimed in claim 8, wherein the clique includes a node group of 266 nodes corresponding to bit strings below:

TABLE 4

| | | | |
|---|---|---|---|
| 00010011011101 | 00100111010011 | 01000011111001 | 01011010110010 |
| 00010011101110 | 00100111101100 | 01000101101011 | 01011101001010 |
| 00010011110011 | 00101001101110 | 01000110011101 | 01011101010100 |
| 00010101011110 | 00101001111001 | 01000110101110 | 01011101100001 |
| 00010101111001 | 00101011001101 | 01000110110011 | 01011110000011 |
| 00010110101101 | 00101011110010 | 01000111011010 | 01011110100100 |
| 00010110111010 | 00101100011110 | 01000111100101 | 01100001111100 |
| 00010111001011 | 00101100101101 | 01001001011110 | 01100010101101 |
| 00010111110100 | 00101100110011 | 01001001101101 | 01100010111010 |
| 00011001110101 | 00101101001011 | 01001001110011 | 01100100011011 |

TABLE 4-continued

| | | | |
|---|---|---|---|
| 00011001111010 | 00101101110100 | 01001011010101 | 01100101001110 |
| 00011010011011 | 00101110010101 | 01001011101010 | 01100101110001 |
| 00011010111100 | 00101110101010 | 01001100110101 | 01100111001001 |
| 00011011010110 | 00101111000110 | 01001100111010 | 01100111010100 |
| 00011011101001 | 00101111100001 | 01001101011001 | 01100111100010 |
| 00011100011101 | 00110001011011 | 01001101100110 | 01101000011101 |
| 00011100101011 | 00110001101101 | 01001110010110 | 01101000101011 |
| 00011100110110 | 00110001110110 | 01001110101001 | 01101000110110 |
| 00011101010011 | 00110100101110 | 01001111001100 | 01101010001110 |
| 00011101101100 | 00110100110101 | 01010010011110 | 01101010110001 |
| 00011110001110 | 00110110011100 | 01010010101011 | 01101011000011 |
| 00011110110001 | 00110110100011 | 01010010110101 | 01101101000101 |
| 00011111000101 | 00111001011100 | 01010100111100 | 01101101010010 |
| 00100011011110 | 00111001100011 | 01010101001101 | 01110000110011 |
| 00100011101011 | 00111011001010 | 01010101110010 | 01110001010101 |
| 00100011110101 | 00111011010001 | 01010111000110 | 01110001101010 |
| 00100101011101 | 00111011100100 | 01010111010001 | 01110010011001 |
| 00100101111010 | 00111110001001 | 01011000101110 | 01110010100110 |
| 00100110110110 | 00111110010010 | 01011000111001 | 01110011001100 |
| 00100110111001 | 01000011110110 | 01011010001101 | 01110011010010 |

TABLE 5

| | | | |
|---|---|---|---|
| 01110011100001 | 10001110001101 | 10101010010110 | 11000001110101 |
| 01110100010110 | 10001110110010 | 10101010101001 | 11000011100011 |
| 01110100101001 | 10001111010100 | 10101101001100 | 11000100101101 |
| 01110110000101 | 10010001111100 | 10101101010001 | 11000100110110 |
| 01110110001010 | 10010010110110 | 10101101100010 | 11000101011100 |
| 01111000011010 | 10010010111001 | 10101110000011 | 11001010011100 |
| 01111000100101 | 10010100011011 | 10101110100100 | 11001011001001 |
| 01111001000110 | 10010101010101 | 10110000101011 | 11001011010010 |
| 01111001001001 | 10010101101010 | 10110001001110 | 11001011100100 |
| 01111010010100 | 10010111001100 | 10110001110001 | 11001100100011 |
| 01111100001100 | 10010111010010 | 10110010011010 | 11001110001010 |
| 01111100010001 | 10010111100001 | 10110010100101 | 11001110010001 |
| 01111100100010 | 10011000011110 | 10110011001001 | 11010000011101 |
| 10000011101101 | 10011000101101 | 10110011010100 | 11010000111010 |
| 10000011111010 | 10011000110011 | 10110011100010 | 11010001010110 |
| 10000101110011 | 10011010010101 | 10110100001101 | 11010001101001 |
| 10000110011110 | 10011010101010 | 10110100110010 | 11010010010011 |
| 10000110101011 | 10011011000011 | 10110101100100 | 11010010101100 |
| 10000110110101 | 10011101000110 | 10110110000110 | 11010011000101 |
| 10000111011001 | 10011101001001 | 10110110010001 | 11010011001010 |
| 10000111100110 | 10100010011101 | 10111000011001 | 11010100001110 |
| 10001001011101 | 10100010101110 | 10111000100110 | 11010100110001 |
| 10001001101011 | 10100010110011 | 10111001000101 | 11010101000011 |
| 10001001110110 | 10100100111100 | 10111001010010 | 11010110001001 |
| 10001011001110 | 10100101010110 | 10111010001100 | 11010110010100 |
| 10001011110001 | 10100101101001 | 10111100001010 | 11010110100010 |
| 10001100101110 | 10100111000101 | 10111100010100 | 11011000001011 |
| 10001100111001 | 10100111001010 | 10111100100001 | 11011000110100 |
| 10001101011010 | 10101000110101 | 11000001011011 | 11011001001100 |
| 10001101100101 | 10101000111010 | 11000001101110 | 11011001010001 |

TABLE 6

| |
|---|
| 11011001100010 |
| 11011010000110 |
| 11011010100001 |
| 11011100000101 |
| 11011100010010 |
| 11100000111001 |
| 11100001001101 |
| 11100001110010 |
| 11100010001011 |
| 11100010110100 |
| 11100011000110 |
| 11100011010001 |
| 11100100010101 |
| 11100100101010 |
| 11100110001100 |
| 11100110010010 |
| 11100110100001 |
| 11101000010011 |
| 11101000101100 |

TABLE 6-continued

| |
|---|
| 11101001001010 |
| 11101001010100 |
| 11101001100001 |
| 11101010000101 |
| 11101010100010 |
| 11101100000110 |
| 11101100001001. |

10. The conversion method as claimed in claim 9, wherein bit strings corresponding to 256 nodes of the node group are uniquely assigned to the respective bit strings each having the first bit length L1, and wherein bit strings corresponding to remaining ten nodes of the node group are used for transmission control.

11. A non-transitory computer-readable recording medium having stored therein a program for causing a computer to perform a process comprising:

acquiring a first bit string having a first bit length L1; and converting, in accordance with conversion information that associates respective bit strings each having the first bit length L1 with bit strings each having a second bit length L2 uniquely assigned to the respective bit strings, the first bit string into a second bit string having the second bit length L2, wherein the conversion information is created by searching for a clique that includes $2^{L1}$ or more nodes, from a graph including nodes and an edge representing the bit strings each having the second bit length L2 that satisfy a predetermined constraint condition.

12. A reverse conversion device comprising:

circuitry configured to:

acquire a second bit string having a second bit length L2; and reversely convert, in accordance with conversion information that associates respective bit strings each having a first bit length L1 with bit strings each having the second bit length L2 uniquely assigned to the respective bit strings, the second bit string into a first bit string having the first bit length L1, wherein the conversion information is created by searching for a clique that includes $2^{L1}$ or more nodes, from a graph including nodes and an edge representing the bit strings each having the second bit length L2 that satisfy a predetermined constraint condition.

13. The reverse conversion device as claimed in claim 12, wherein when the first bit length L1 is 8 and the second bit length L2 is 14, the predetermined constraint condition includes 1) Each of the bit strings each having the second bit length L2 is composed of an equal number of bits “0”s and “1”s, 2) Run lengths of all of the bit strings each having the second bit length L2 are 5 or less, 3) The run lengths of all of the bit strings each having the second bit length L2 are 7 or less in a 1-bit flip, 4) A run length of a bit string obtained by concatenating two bit strings each having the second bit length L2 is 5 or less, 5) A run length of a bit string obtained by concatenating two bit strings each having the second bit length L2 is 11 or less in a 2-bit flip, and a distance between two bits to be inverted is 4 or greater, and 6) A hamming distance between two bit strings each having the second bit length L2 is 4 or greater.

14. The reverse conversion device as claimed in claim 13, wherein the conversion information is created by searching for the clique that includes the 2 or more nodes from the graph.

15. The reverse conversion device as claimed in claim 14, wherein the clique includes a node group of 266 nodes corresponding to bit strings below:

TABLE 7

| | |
|---|---|
| D.0 | 00010011011101 |
| D.1 | 00010011101110 |
| D.2 | 00010011110011 |
| D.3 | 00010101011110 |
| D.4 | 00010101111001 |
| D.5 | 00010110101101 |
| D.6 | 00010110111010 |
| D.7 | 00010111001011 |
| D.8 | 00010111110100 |
| D.9 | 00011001110101 |
| D.10 | 00011001111010 |
| D.11 | 00011010011011 |
| D.12 | 00011010111100 |
| D.13 | 00011011010110 |
| D.14 | 00011011101001 |
| D.15 | 00011100011101 |
| D.16 | 00011100101011 |
| D.17 | 00011100110110 |
| D.18 | 00011101010011 |
| D.19 | 00011101101100 |
| D.20 | 00011110001110 |
| D.21 | 00011110110001 |
| D.22 | 00011111000101 |
| D.23 | 00100011011110 |
| D.24 | 00100011101011 |
| D.25 | 00100011110101 |
| D.26 | 00100101011101 |
| D.27 | 00100101111010 |
| D.28 | 00100110110110 |
| D.29 | 00100110111001 |
| D.30 | 00100111010011 |
| D.31 | 00100111101100 |
| D.32 | 00101001101110 |
| D.33 | 00101001111001 |
| D.34 | 00101011001101 |
| D.35 | 00101011110010 |
| D.36 | 00101100011110 |
| D.37 | 00101100101101 |
| D.38 | 00101100110011 |
| D.39 | 00101101001011 |
| D.40 | 00101101110100 |
| D.41 | 00101110010101 |
| D.42 | 00101110101010 |
| D.43 | 00101111000110 |
| D.44 | 00101111100001 |
| D.45 | 00110001011011 |
| D.46 | 00110001101101 |
| D.47 | 00110001110110 |
| D.48 | 00110100101110 |
| D.49 | 00110100110101 |
| D.50 | 00110110011100 |
| D.51 | 00110110100011 |
| D.52 | 00111001011100 |
| D.53 | 00111001100011 |
| D.54 | 00111011001010 |
| D.55 | 00111011010001 |
| D.56 | 00111011100100 |
| D.57 | 00111110001001 |
| D.58 | 00111110010010 |
| D.59 | 01000011110110 |
| D.60 | 01000011111001 |
| D.61 | 01000101101011 |
| D.62 | 01000110011101 |
| D.63 | 01000110101110 |
| D.64 | 01000110110011 |
| D.65 | 01000111011010 |
| D.66 | 01000111100101 |
| D.67 | 01001001011110 |
| D.68 | 01001001101101 |
| D.69 | 01001001110011 |

TABLE 7-continued

| | |
|---|---|
| D.70 | 01001011010101 |
| D.71 | 01001011101010 |
| D.72 | 01001100110101 |
| D.73 | 01001100111010 |
| D.74 | 01001101011001 |
| D.75 | 01001101100110 |
| D.78 | 01001110010110 |
| D.77 | 01001110101001 |
| D.78 | 01001111001100 |
| D.79 | 01010010011110 |
| D.80 | 01010010101011 |
| D.81 | 01010010110101 |
| D.82 | 01010100111100 |
| D.83 | 01010101001101 |
| D.84 | 01010101110010 |
| D.85 | 01010111000110 |
| D.86 | 01010111010001 |
| D.87 | 01011000101110 |
| D.88 | 01011000111001 |
| D.89 | 01011010001101 |
| D.90 | 01011010110010 |
| D.91 | 01011101001010 |
| D.92 | 01011101010100 |
| D.93 | 01011101100001 |
| D.94 | 01011110000011 |
| D.95 | 01011110100100 |
| D.96 | 01100001111100 |
| D.97 | 01100010101101 |
| D.98 | 01100010111010 |
| D.99 | 01100100011011 |
| D.100 | 01100101001110 |
| D.101 | 01100101110001 |
| D.102 | 01100111001001 |
| D.103 | 01100111010100 |
| D.104 | 01100111100010 |
| D.105 | 01101000011101 |
| D.106 | 01101000101011 |
| D.107 | 01101000110110 |
| D.108 | 01101010001110 |
| D.109 | 01101010110001 |
| D.110 | 01101011000011 |
| D.111 | 01101101000101 |
| D.112 | 01101101010010 |
| D.113 | 01110000110011 |
| D.114 | 01110001010101 |
| D.115 | 01110001101010 |
| D.116 | 01110010011001 |
| D.117 | 01110010100110 |
| D.118 | 01110011001100 |
| D.119 | 01110011010010 |

TABLE 8

| | |
|---|---|
| D.120 | 01110011100001 |
| D.121 | 01110100010110 |
| D.122 | 01110100101001 |
| D.123 | 01110110000101 |
| D.124 | 01110110001010 |
| D.125 | 01111000011010 |
| D.126 | 01111000100101 |
| D.127 | 01111001000110 |
| D.128 | 01111001001001 |
| D.129 | 01111010010100 |
| D.130 | 01111100001100 |
| D.131 | 01111100010001 |
| D.132 | 01111100100010 |
| D.133 | 10000011101101 |
| D.134 | 10000011111010 |
| D.135 | 10000101110011 |
| D.136 | 10000110011110 |
| D.137 | 10000110101011 |
| D.138 | 10000110110101 |
| D.139 | 10000111011001 |
| D.140 | 10000111100110 |
| D.141 | 10001001011101 |
| D.142 | 10001001101011 |
| D.143 | 10001001110110 |

TABLE 8-continued

| | |
|---|---|
| D.144 | 10001011001110 |
| D.145 | 10001011110001 |
| D.146 | 10001100101110 |
| D.147 | 10001100111001 |
| D.148 | 10001101011010 |
| D.149 | 10001101100101 |
| D.150 | 10001110001101 |
| D.151 | 10001110110010 |
| D.152 | 10001111010100 |
| D.153 | 10010001111100 |
| D.154 | 10010010110110 |
| D.155 | 10010010111001 |
| D.158 | 10010100011011 |
| D.157 | 10010101010101 |
| D.158 | 10010101101010 |
| D.159 | 10010111001100 |
| D.160 | 10010111010010 |
| D.161 | 10010111100001 |
| D.162 | 10011000011110 |
| D.163 | 10011000101101 |
| D.164 | 10011000110011 |
| D.165 | 10011010010101 |
| D.166 | 10011010101010 |
| D.167 | 10011011000011 |
| D.168 | 10011101000110 |
| D.169 | 10011101001001 |
| D.170 | 10100010011101 |
| D.171 | 10100010101110 |
| D.172 | 10100010110011 |
| D.173 | 10100100111100 |
| D.174 | 10100101010110 |
| D.175 | 10100101101001 |
| D.176 | 10100111000101 |
| D.177 | 10100111001010 |
| D.178 | 10101000110101 |
| D.179 | 10101000111010 |
| D.180 | 10101010010110 |
| D.181 | 10101010101001 |
| D.182 | 10101101001100 |
| D.183 | 10101101010001 |
| D.184 | 10101101100010 |
| D.185 | 10101110000011 |
| D.188 | 10101110100100 |
| D.187 | 10110000101011 |
| D.188 | 10110001001110 |
| D.189 | 10110001110001 |
| D.100 | 10110010011010 |
| D.191 | 10110010100101 |
| D.192 | 10110011001001 |
| D.193 | 10110011010100 |
| D.194 | 10110011100010 |
| D.195 | 10110100001101 |
| D.196 | 10110100110010 |
| D.197 | 10110101100100 |
| D.198 | 10110110000110 |
| D.199 | 10110110010001 |
| D.200 | 10111000011001 |
| D.201 | 10111000100110 |
| D.202 | 10111001000101 |
| D.203 | 10111001010010 |
| D.204 | 10111010001100 |
| D.205 | 10111100001010 |
| D.206 | 10111100010100 |
| D.207 | 10111100100001 |
| D.208 | 11000001011011 |
| D.209 | 11000001101110 |
| D.210 | 11000001110101 |
| D.211 | 11000011100011 |
| D.212 | 11000100101101 |
| D.213 | 11000100110110 |
| D.214 | 11000101011100 |
| D.215 | 11001010011100 |
| D.216 | 11001011001001 |
| D.217 | 11001011010010 |
| D.218 | 11001011100100 |
| D.219 | 11001100100011 |
| D.220 | 11001110001010 |
| D.221 | 11001110010001 |
| D.222 | 11010000011101 |
| D.223 | 11010000111010 |

TABLE 8-continued

| | |
|---|---|
| D.224 | 11010001010110 |
| D.225 | 11010001101001 |
| D.226 | 11010010010011 |
| D.227 | 11010010101100 |
| D.228 | 11010011000101 |
| D.229 | 11010011001010 |
| D.230 | 11010100001110 |
| D.231 | 11010100110001 |
| D.232 | 11010101000013 |
| D.233 | 11010110001001 |
| D.234 | 11010110010100 |
| D.235 | 11010110100010 |
| D.236 | 11011000001011 |
| D.237 | 11011000110100 |
| D.238 | 11011001001100 |
| D.239 | 11011001010001 |

TABLE 9

| | |
|---|---|
| D.240 | 11011001100010 |
| D.241 | 11011010000110 |
| D.242 | 11011010100001 |
| D.243 | 11011100000101 |
| D.244 | 11011100010010 |
| D.245 | 11100000111001 |
| D.246 | 11100001001101 |
| D.247 | 11100001110010 |
| D.248 | 11100010001011 |
| D.249 | 11100010110100 |
| D.250 | 11100011000110 |
| D.251 | 11100011010001 |
| D.252 | 11100100010101 |
| D.253 | 11100100101010 |
| D.254 | 11100110001100 |
| D.255 | 11100110010010 |
| K.0 | 11100110100001 |
| K.1 | 11101000010011 |
| K.2 | 11101000101100 |
| K.3 | 11101001001010 |
| K.4 | 11101001010100 |
| K.5 | 11101001100001 |
| K.6 | 11101010000101 |
| K.7 | 11101010100010 |
| K.8 | 11101100000110 |
| K.9 | 11101100001001. |

16. The reverse conversion device as claimed in claim 15, wherein bit strings corresponding to 256 nodes of the node group are uniquely assigned to the respective bit strings each having the first bit length L1, and wherein bit strings corresponding to remaining ten nodes of the node group are used for transmission control.

17. A reverse conversion method comprising:

acquiring, by one or more processors, a second bit string having a second bit length L2; and reversely converting, by the one or more processors, in accordance with conversion information that associates respective bit strings each having a first bit length L1 with bit strings each having the second bit length L2 uniquely assigned to the respective bit strings, the second bit string into a first bit string having the first bit length L1, wherein the conversion information is created by searching for a clique that includes $2^{L1}$ or more nodes, from a graph including nodes and an edge representing the bit strings each having the second bit length L2 that satisfy a predetermined constraint condition.

18. The reverse conversion method as claimed in claim 17, wherein when the first bit length L1 is 8 and the second bit length L2 is 14, the predetermined constraint condition includes 1) Each of the bit strings each having the second bit length L2 is composed of an equal number of bits “0”'s and “1”s,
2) Run lengths of all of the bit strings each having the second bit length L2 are 5 or less,
3) The run lengths of all of the bit strings each having the second bit length L2 are 7 or less in a 1-bit flip,
4) A run length of a bit string obtained by concatenating two bit strings each having the second bit length L2 is 5 or less,
5) A run length of a bit string obtained by concatenating two bit strings each having the second bit length L2 is 11 or less in a 2-bit flip, and a distance between two bits to be inverted is 4 or greater, and
6) A hamming distance between two bit strings each having the second bit length L2 is 4 or greater.

19. The reverse conversion method as claimed in claim 18, wherein the conversion information is created by searching for the clique that includes the $2^{L1}$ or more nodes from the graph.

20. The reverse conversion method as claimed in claim 19, wherein the clique includes a node group of 266 nodes corresponding to bit strings below:

TABLE 10

| | |
|---|---|
| D.0 | 00010011011101 |
| D.1 | 00010011101110 |
| D.2 | 00010011110011 |
| D.3 | 00010101011110 |
| D.4 | 00010101111001 |
| D.5 | 00010110101101 |
| D.6 | 00010110111010 |
| D.7 | 00010111001011 |
| D.8 | 00010111110100 |
| D.9 | 00011001110101 |
| D.10 | 00011001111010 |
| D.11 | 00011010011011 |
| D.12 | 00011010111100 |
| D.13 | 00011011010110 |
| D.14 | 00011011101001 |
| D.15 | 00011100011101 |
| D.16 | 00011100101011 |
| D.17 | 00011100110110 |
| D.18 | 00011101010011 |
| D.19 | 00011101101100 |
| D.20 | 00011110001110 |
| D.21 | 00011110110001 |
| D.22 | 00011111000101 |
| D.23 | 00100011011110 |
| D.24 | 00100011101011 |
| D.25 | 00100011110101 |
| D.26 | 00100101011101 |
| D.27 | 00100101111010 |
| D.28 | 00100110110110 |
| D.29 | 00100110111001 |
| D.30 | 00100111010011 |
| D.31 | 00100111101100 |
| D.32 | 00101001101110 |
| D.33 | 00101001111001 |
| D.34 | 00101011001101 |
| D.35 | 00101011110010 |
| D.36 | 00101100011110 |
| D.37 | 00101100101101 |
| D.38 | 00101100110011 |
| D.39 | 00101101001011 |
| D.40 | 00101101110100 |
| D.41 | 00101110010101 |
| D.42 | 00101110101010 |
| D.43 | 00101111000110 |
| D.44 | 00101111100001 |
| D.45 | 00110001011011 |
| D.46 | 00110001101101 |
| D.47 | 00110001110110 |
| D.48 | 00110100101110 |
| D.49 | 00110100110101 |

TABLE 10-continued

| | |
|---|---|
| D.50 | 00110110011100 |
| D.51 | 00110110100011 |
| D.52 | 00111001011100 |
| D.53 | 00111001100011 |
| D.54 | 00111011001010 |
| D.55 | 00111011010001 |
| D.56 | 00111011100100 |
| D.57 | 00111110001001 |
| D.58 | 00111110010010 |
| D.59 | 01000011110110 |
| D.60 | 01000011111001 |
| D.61 | 01000101101011 |
| D.62 | 01000110011101 |
| D.63 | 01000110101110 |
| D.64 | 01000110110011 |
| D.65 | 01000111011010 |
| D.86 | 01000111100101 |
| D.67 | 01001001011110 |
| D.68 | 01001001101101 |
| D.69 | 01001001110011 |
| D.70 | 01001011010101 |
| D.71 | 01001011101010 |
| D.72 | 01001100110101 |
| D.73 | 01001100111010 |
| D.74 | 01001101011001 |
| D.75 | 01001101100110 |
| D.76 | 01001110010110 |
| D.77 | 01001110101001 |
| D.78 | 01001111001100 |
| D.79 | 01010010011110 |
| D.80 | 01010010101011 |
| D.81 | 01010010110101 |
| D.82 | 01010100111100 |
| D.83 | 01010101001101 |
| D.84 | 01010101110010 |
| D.85 | 01010111000110 |
| D.86 | 01010111010001 |
| D.87 | 01011000101110 |
| D.88 | 01011000111001 |
| D.89 | 01011010001101 |
| D.90 | 01011010110010 |
| D.91 | 01011101001010 |
| D.92 | 01011101010100 |
| D.93 | 01011101100001 |
| D.94 | 01011110000011 |
| D.95 | 01011110100100 |
| D.96 | 01100001111100 |
| D.97 | 01100010101101 |
| D.98 | 01100010111010 |
| D.99 | 01100100011011 |
| D.100 | 01100101001110 |
| D.101 | 01100101110001 |
| D.102 | 01100111001001 |
| D.103 | 01100111010100 |
| D.104 | 01100111100010 |
| D.105 | 01101000011101 |
| D.106 | 01101000101013 |
| D.107 | 01101000110110 |
| D.108 | 01101010001110 |
| D.109 | 01101010110001 |
| D.110 | 01101011000011 |
| D.111 | 01101101000101 |
| D.112 | 01101101010010 |
| D.113 | 01110000110011 |
| D.114 | 01110001010101 |
| D.115 | 01110001101010 |
| D.116 | 01110010011001 |
| D.117 | 01110010100110 |
| D.118 | 01110011001100 |
| D.119 | 01110011010010 |

TABLE 11

| | |
|---|---|
| D.120 | 01110011100001 |
| D.121 | 01110100010110 |
| D.122 | 01110100101001 |
| D.123 | 01110110000101 |

TABLE 11-continued

| | |
|---|---|
| D.124 | 01110110001010 |
| D.125 | 01111000011010 |
| D.126 | 01111000100101 |
| D.127 | 01111001000110 |
| D.128 | 01111001001001 |
| D.129 | 01111010010100 |
| D.130 | 01111100001100 |
| D.131 | 01111100010001 |
| D.132 | 01111100100010 |
| D.133 | 10000011101101 |
| D.134 | 10000011111010 |
| D.135 | 10000101110011 |
| D.136 | 10000110011110 |
| D.137 | 10000110101011 |
| D.138 | 10000110110101 |
| D.139 | 10000111011001 |
| D.140 | 10000111100110 |
| D.141 | 10001001011101 |
| D.142 | 10001001101011 |
| D.143 | 10001001110110 |
| D.144 | 10001011001110 |
| D.145 | 10001011110001 |
| D.146 | 10001100101110 |
| D.147 | 10001100111001 |
| D.148 | 10001101011010 |
| D.149 | 10001101100101 |
| D.150 | 10001110001101 |
| D.151 | 10001110110010 |
| D.152 | 10001111010100 |
| D.153 | 10010001111100 |
| D.154 | 10010010110110 |
| D.155 | 10010010111001 |
| D.156 | 10010100011011 |
| D.157 | 10010101010101 |
| D.158 | 10010101101010 |
| D.159 | 10010111001100 |
| D.160 | 10010111010010 |
| D.161 | 10010111100001 |
| D.162 | 10011000011110 |
| D.163 | 10011000101101 |
| D.164 | 10011000110011 |
| D.165 | 10011010010101 |
| D.166 | 10011010101010 |
| D.167 | 10011011000011 |
| D.168 | 10011101000110 |
| D.169 | 10011101001001 |
| D.170 | 10100010011101 |
| D.171 | 10100010101110 |
| D.172 | 10100010110011 |
| D.173 | 10100100111100 |
| D.174 | 10100101010110 |
| D.175 | 10100101101001 |
| D.176 | 10100111000101 |
| D.177 | 10100111001010 |
| D.178 | 10101000110101 |
| D.179 | 10101000111010 |
| D.180 | 10101010010110 |
| D.181 | 10101010101001 |
| D.182 | 10101101001100 |
| D.183 | 10101101010001 |
| D.184 | 10101101100010 |
| D.185 | 10101110000011 |
| D.186 | 10101110100100 |
| D.187 | 10110000101011 |
| D.188 | 10110001001110 |
| D.189 | 10110001110001 |
| D.190 | 10110010011010 |
| D.191 | 10110010100101 |
| D.192 | 10110011001001 |
| D.193 | 10110011010100 |
| D.194 | 10110011100010 |
| D.195 | 10110100001101 |
| D.196 | 10110100110010 |
| D.197 | 10110101100100 |
| D.198 | 10110110000110 |
| D.199 | 10110110010001 |
| D.200 | 10111000011001 |
| D.201 | 10111000100110 |
| D.202 | 10111001000101 |
| D.203 | 10111001010010 |

TABLE 11-continued

| | |
|---|---|
| D.204 | 10111010001100 |
| D.205 | 10111100001010 |
| D.206 | 10111100010100 |
| D.207 | 10111100100001 |
| D.208 | 11000001011011 |
| D.209 | 11000001101310 |
| D.210 | 11000001110101 |
| D.211 | 11000011100011 |
| D.212 | 11000100101101 |
| D.213 | 11000100110110 |
| D.214 | 11000101011100 |
| D.215 | 11001010011100 |
| D.216 | 11001011001001 |
| D.217 | 11001011010010 |
| D.218 | 11001011100100 |
| D.219 | 11001100100011 |
| D.220 | 11001110001010 |
| D.221 | 11001110010001 |
| D.222 | 11010000011101 |
| D.223 | 11010000111010 |
| D.224 | 11010001010110 |
| D.225 | 11010001101001 |
| D.226 | 11010010010011 |
| D.227 | 11010010101100 |
| D.228 | 11010011000101 |
| D.229 | 11010011001010 |
| D.230 | 11010100001110 |
| D.231 | 11010100110001 |
| D.232 | 11010101000011 |
| D.233 | 11010110001001 |
| D.234 | 11010110010100 |
| D.235 | 11010110100010 |
| D.236 | 11011000001011 |
| D.237 | 11011000110100 |
| D.238 | 11011001001100 |
| D.239 | 11011001010001 |

TABLE 12

| | |
|---|---|
| D.240 | 11011001100010 |
| D.241 | 11011010000110 |
| D.242 | 11011010100001 |
| D.243 | 11011100000101 |
| D.244 | 11011100010010 |
| D.245 | 11100000111001 |
| D.246 | 11100001001101 |
| D.247 | 11100001110010 |
| D.248 | 11100010001011 |
| D.249 | 11100010110100 |
| D.250 | 11100011000110 |
| D.251 | 11100011010001 |
| D.252 | 11100100010101 |
| D.253 | 11100100101010 |
| D.254 | 11100110001100 |
| D.255 | 11100110010010 |
| K.0 | 11100110100001 |
| K.1 | 11101000010011 |
| K.2 | 11101000101100 |
| K.3 | 11101001001010 |
| K.4 | 11101001010100 |
| K.5 | 11101001100001 |
| K.6 | 11101010000101 |
| K.7 | 11101010100010 |
| K.8 | 11101100000110 |
| K.9 | 11101100001001. |

21. The reverse conversion method as claimed in claim 20, wherein bit strings corresponding to 256 nodes of the node group are uniquely assigned to the respective bit strings each having the first bit length L1, and wherein bit strings corresponding to remaining ten nodes of the node group are used for transmission control.

22. A non-transitory computer-readable recording medium having stored therein a program for causing a computer to perform a process comprising:

acquiring a second bit string having a second bit length L2; and reversely converting, in accordance with conversion information that associates respective bit strings each having a first bit length L1 with bit strings each having the second bit length L2 uniquely assigned to the respective bit strings, the second bit string into a first bit string having the first bit length L1, wherein the conversion information is created by searching for a clique that includes $2^{L1}$ or more nodes, from a graph including nodes and an edge representing the bit strings each having the second bit length L2 that satisfy a predetermined constraint condition.

* * * * *